United States Patent
Tanaka et al.

(10) Patent No.: US 12,319,601 B2
(45) Date of Patent: Jun. 3, 2025

(54) APPARATUS AND METHOD FOR BIOLOGICAL TREATMENT OF ORGANIC WASTEWATER

(71) Applicant: EBARA JITSUGYO CO., LTD., Tokyo (JP)

(72) Inventors: Toshihiro Tanaka, Tokyo (JP); Kiyomi Kabasawa, Tokyo (JP); Yasuharu Sato, Tokyo (JP)

(73) Assignee: EBARA JITSUGYO CO., LTD., Tokyo (JP)

( * ) Notice: Subject to any disclaimer, the term of this patent is extended or adjusted under 35 U.S.C. 154(b) by 391 days.

(21) Appl. No.: 17/285,612

(22) PCT Filed: Oct. 17, 2019

(86) PCT No.: PCT/JP2019/040862
§ 371 (c)(1),
(2) Date: Apr. 15, 2021

(87) PCT Pub. No.: WO2020/080460
PCT Pub. Date: Apr. 23, 2020

(65) Prior Publication Data
US 2021/0395122 A1    Dec. 23, 2021

(30) Foreign Application Priority Data
Oct. 17, 2018 (JP) .................................. 2018-195964

(51) Int. Cl.
*C02F 3/12* (2023.01)
*B01F 23/231* (2022.01)
(Continued)

(52) U.S. Cl.
CPC ........ *C02F 3/1278* (2013.01); *B01F 23/2311* (2022.01); *B01F 25/50* (2022.01);
(Continued)

(58) Field of Classification Search
CPC .......... C02F 3/1278; C02F 1/006; C02F 3/20; C02F 2001/007; C02F 2201/007;
(Continued)

(56) References Cited

U.S. PATENT DOCUMENTS

2015/0353397 A1*  12/2015  Cath .................... C02F 3/1268
                                                     210/253

FOREIGN PATENT DOCUMENTS

| JP | S55-22324  | * | 2/1980 |
| JP | S5520649 A |   | 2/1980 |

(Continued)

OTHER PUBLICATIONS

English language machine translation of WO2016132882A1, 10 pages, No Date.*

(Continued)

*Primary Examiner* — Pranav N Patel
(74) *Attorney, Agent, or Firm* — Juan Carlos A. Marquez; Marquez IP Law Office, PLLC

(57) ABSTRACT

Provided are an apparatus and a method for biological treatment of an organic wastewater where it is possible to efficiently remove organic matter under high load while reducing the amount of air used for aerobic biological treatment and substantially decreasing the amount of sludge generated. The apparatus is provided with: a first biological treatment tank which has a fixed-type immobilized biocarrier and an aeration means; a second biological treatment tank to which a treated liquid from the first tank is introduced so as to perform treatment using suspended microorganisms, and which has an aeration means; and a sedimentation tank in which solid-liquid from the second tank is separated said liquid into settled sludge and treated water, wherein the apparatus has an influent line through which an organic wastewater is introduced to the first tank and the (Continued)

second tank, and a return line through which part of settled sludge discharged from the tank is returned to the tank.

8 Claims, 5 Drawing Sheets

(51) Int. Cl.
*B01F 25/50* (2022.01)
*C02F 1/00* (2023.01)
*C02F 3/20* (2023.01)

(52) U.S. Cl.
CPC ............... *C02F 1/006* (2013.01); *C02F 3/20* (2013.01); *C02F 2001/007* (2013.01); *C02F 2201/007* (2013.01); *C02F 2203/006* (2013.01); *C02F 2209/08* (2013.01); *C02F 2301/026* (2013.01); *C02F 2301/046* (2013.01); *C02F 2303/06* (2013.01)

(58) Field of Classification Search
CPC ............ C02F 2203/006; C02F 2209/08; C02F 2301/026; C02F 2301/046; C02F 2303/06; C02F 3/1221; C02F 3/1284; C02F 3/006; C02F 3/06; C02F 3/12; C02F 3/10; C02F 3/1215; C02F 2209/001; C02F 2209/006; C02F 2209/10; C02F 3/121; C02F 3/1268; C02F 3/1273; C02F 11/02; C02F 2203/00; B01F 23/2311; B01F 25/50; Y02W 10/10; B01D 2311/04; B01D 2311/2688; B01D 2315/06; B01D 61/58
See application file for complete search history.

(56) References Cited

FOREIGN PATENT DOCUMENTS

| | | | |
|---|---|---|---|
| JP | 855149697 A | | 11/1980 |
| JP | H08290185 A | | 11/1996 |
| JP | 2005211788 A | * | 8/2005 |
| JP | 2007190510 A | * | 8/2007 |
| JP | 2009202115 A | | 9/2009 |
| JP | 2013141640 A | | 7/2013 |
| JP | 2016150332 A | | 8/2016 |
| JP | 2017159243 A | | 9/2017 |
| JP | WO2018123647 | * | 7/2018 |
| SG | 193336 A1 | | 10/2013 |
| WO | WO-2007029509 A1 | * | 3/2007 ................ C02F 3/06 |
| WO | 2012124675 A1 | | 9/2012 |
| WO | 2016132882 A1 | | 8/2016 |
| WO | 2018055793 A1 | | 3/2018 |

OTHER PUBLICATIONS

English language machine translation of JP2005211788A, 5 pages, No Date.*
English language machine translation of JP2007190510A, 14 pages, No Date.*
English language machine translation of WO2018123647, 12 pages No Date.*
English language machine translation of WO 2007029509A1, 11 pages, No Date.*
English language machine translation of JPS5522324, 2 pages, No Date.*
WO2020/080460A1 Published Application with Search Report, Apr. 23, 2020 in corunterpart PCTapplication PCT/JP2019/040862, 56 pages.
"Easy Water Treatment, " Somiya, Tanaka Print Co., Ltd., Dec. 25, 2008, 4 pages in Japanese, 1-page English abstract.

* cited by examiner

APPARATUS AND METHOD FOR BIOLOGICAL TREATMENT OF ORGANIC WASTEWATER

This application is a national stage application filed under 35 U.S.C. § 371, of International Patent Application No. PCT/JP2019/040862, filed on Oct. 17, 2019, which is incorporated by reference herein its entirety.

TECHNICAL FIELD

The present invention relates to an apparatus and a method for biological treatment of organic wastewater, and in particular, to an apparatus and a method for biological treatment of organic wastewater where it is possible to improve the treatment efficiency by means of microorganisms and to plan an improvement in water quality by means of suspended microorganisms.

BACKGROUND ART

When the biochemical oxygen demand (BOD) concentration of the organic wastewater is 300 mg/L or less at the time of the treatment of the organic wastewater in a wide range that includes sewage, domestic wastewater, wastewater from food processing factories and the like, a high volume of water becomes necessary due to the high load of the treatment, and thus, the time during which the wastewater stays within the treatment tank becomes shorter. As a result, it is required not only for the BOD of the treated water, but also for the concentration of the suspended solids (SS) to be low when the treated water is evaluated.

In the biological treatment of organic wastewater, an activated sludge method with the use of suspended microorganisms is widely used. Excellence in the water quality of the treated water and easiness in the maintenance contribute to the wide use of the activated sludge method in the facilities for sewage treatment and industrial wastewater treatment. However, the BOD volume load in the activated sludge method is 0.2 to 0.8 kg-BOD/m$^3$/d (d means the day), and thus, there is room for technical improvement.

In addition to the above, there is a fluidized bed method with the use of a carrier for holding microorganisms at a high concentration within the treatment tank for the biological treatment of organic wastewater. This method is excellent in terms of the treatment efficiency where the BOD volume load is 2 to 3 kg-BOD/m$^3$/d, and thus, the organic load is high as compared to the activated sludge method; however, the SS concentration in the treated water is high, which makes it a general practice to provide an SS removal facility such as a filtration facility in the later stage in accordance with the fluidized bed method.

In addition to single treatment systems such as the above-described activated sludge method and fluidized bed method, the wastewater treatments that have been carried out include a hybrid wastewater treatment where a first biological treatment by means of non-cohesive sludge and a second biological treatment with use of a suspended sludge are combined. Concretely, there is a technology as described below, and problematic points in the prior art are listed by citing typical patent literature.

Patent Literature 1 discloses a first treatment tank which is not filled in with a carrier and where organic wastewater is treated with bacteria so that the organic materials included in the wastewater are oxidatively decomposed, and thus are converted to non-cohesive bacteria that includes dispersed bacteria, which is then followed by a second treatment tank to which sludge is returned from a sedimentation tank so as to be predation removed by sessile protozoan, which makes the generated amount of excess sludge extremely small.

As for the treatment in the first treatment tank which is not filled in with a carrier, the proliferation of non-cohesive bacteria becomes rate limiting, and thus, the treatment cannot be adapted as a treatment with short residence time. According to Patent Literature 1, it is necessary for the residence time of the wastewater to be as long as three to ten days.

In addition, it is necessary in the second treatment tank for a flock where solid-liquid separation is possible to be generated. In order to proliferate a protozoan of which the proliferation rate is small, it is necessary for the residence time of the sludge in the second treatment tank to be long without the addition of a BOD source. As a result, it is necessary for the volumes of the second treatment tank and the sedimentation tank to be large.

Patent Literature 2 shows that organic wastewater is introduced into a first biological treatment tank for biological treatment by means of bacteria, the first biologically-treated water that includes bacteria in a dispersed state is made to pass from the first biological treatment tank through a second biological treatment tank of a fluidized bed type in a once-through manner so as to gain the second biologically-treated water, the third biologically-treated water that has been gained by passing the second biologically-treated water through a third biological treatment tank of a suspended is solid-liquid separated in a sedimentation tank into sludge and treated water, and part of the separated sludge is returned to the third biological treatment tank as returned sludge. It is also shown that the first biological treatment tank is a fluidized bed type biological treatment tank where the carrier filling ratio is 10% or less, and the second biological treatment tank is a fluidized bed type biological treatment tank where the carrier filling ratio is 10% or greater.

Patent Literature 2 also shows that the raw organic wastewater is distributed to the first biological treatment tank and the third biological treatment tank in order to secure an appropriate organic load in the biological treatment tank in the later stage. In addition, such an operation is illustrated where the sludge load due to the soluble BOD in the third biological treatment tank becomes 0.025 kg-BOD/kg-MLSS/d or greater as a rough estimation for the distribution.

In all the modes disclosed in Patent Literature 2, one or both of the first biological treatment tank and the second biological treatment tank is filled in with fluidized bed type carriers. In the case where a tank is filled in with carriers, it is necessary to provide a carrier separation means such as a screen so that the carriers are separated and the mixed liquid can be taken out. In order to make the carriers flow, an amount of air that is greater than that required for biological treatment is necessary as a power source.

In this treatment system, carriers flow due to the inflow of the raw water into either the first treatment tank or the second treatment tank so as to be integrated in the vicinity of the screen on the downstream side in the tank. As a result, such a problem arises that the discharge of a mixed liquid from the tank becomes difficult due to the filtration resistance caused by the carriers. A predetermined performance cannot be exercised unless the integrated carriers are moved to the upstream side of the tank, and therefore, efficient treatment by means of the fluidized bed carriers is prevented.

In addition, it has been clarified that the fluidized bed carriers are shifted too far towards the downflow side of the treatment tank, which prevents bacteria in a dispersed state from proliferating in the case where the residence time of the raw water in the treatment tank is as short as several hours.

Patent Literature 3 discloses a fluidized bed method through the addition of carriers in terms of high load treatment of organic wastewater in the same manner as in Patent Literature 2. In the case where this method is used, an operation with a BOD volume load of 3 kg/m$^3$/d or greater becomes possible. However, the amount of sludge generated in accordance with this method is approximately 30% of the decomposed BOD, which is higher than that in a conventional activated sludge method, and thus becomes a defect.

Concretely, discharged organic water is introduced into the first biological treatment tank for biological treatment by means of bacteria, the first biologically-treated water that includes bacteria in a dispersed state is made to pass from the first biological treatment tank through the second biological treatment tank so as to gain the second biologically-treated water, and solid-liquid separation is carried out on the second biologically-treated water. Fluidized bed carriers and swim bed carriers are provided in the second biological treatment tank as animalcule support carriers. It is also shown that part of the sludge may be returned to the first biological treatment tank from the biological treatment tank in the later stage, the first biological treatment tank may be formed of a multiple stage with two or more tanks, or carriers may be added to the first biological treatment tank, and thus, high load treatment with the BOD volume load being 5 kg/m$^3$/d or greater becomes possible.

In this treatment system as well, carriers are added for the use of the activated sludge method by allowing the treated liquid and the returned sludge to flow into both the first treatment tank and the second treatment tank in accordance with a high load treatment method.

In the treatment system in Patent Literature 3 as well, like in Patent Literature 2, such a problem arises where carriers further flow so as to be integrated in the vicinity of the screen on the downside of the tank. Therefore, such an issue arises that the discharge of the mixed liquid from the tank becomes difficult due to the filtration resistance caused by the carriers in the vicinity of the screen. Another issue arises that a predetermined performance cannot be exercised unless the integrated carriers are shifted towards the upstream side of the tank.

In order to deal with this, the present inventors have proposed as in Patent Literature 4 the arrangement of a fixed-type immobilized biocarrier (which is expressed as "fixed-type contact carrier" in Patent Literature 4) within a biological treatment tank.

The fixed-type immobilized biocarrier can solve the problem caused by the fluidized bed type carriers (fluidized carriers) as pointed out in Patent Literature 2 and 3, and thus, it has been confirmed that organic wastewater can be efficiently treated. However, as the treated amount within the biological treatment tank increases, such a new problem arises that a large concentration of suspended solids (SS) is generated, and at the same time, the soluble BOD becomes high, which makes the treated water to be discharged be in a muddy state with a significant deterioration in the water quality.

In order to remove microscopic suspended solids (SS) and soluble BOD, it is necessary to add a treatment step by means of suspended microorganisms and a sedimentation step in the later stage. In order to provide a treatment tank with suspended microorganisms and a sedimentation tank having a treatment capacity that matches the treatment capacity of the biological treatment tank that uses a fixed-type immobilized biocarrier, however, a volume that is at least several times greater than the volume of the biological treatment tank is indispensable.

In addition, the suspended microorganisms within the treatment tank in the later stage do not sufficiently proliferate in the treated water that has been treated in the biological treatment tank where a fixed-type immobilized biocarrier is used, and thus, it has been found that the treatment effects by the suspended microorganisms cannot be sufficiently expected.

CITATION LIST

Patent Literature

Patent Literature 1: Japanese Unexamined Patent Publication S55 (1980)-20649

Patent Literature 2: Japanese Unexamined Patent Publication 2009-202115

Patent Literature 3: Japanese Unexamined Patent Publication 2013-141640

Patent Literature 4: Japanese Unexamined Patent Publication 2017-159243

Non-Patent Literature

Non-Patent Literature 1: Isao Somiya, "Easy Water Treatment," Publisher: Tanaka Print Co., Ltd., Issued on Dec. 25, 2008.

SUMMARY OF THE INVENTION

Technical Problem

In view of the above-described problems, an object of the present invention is to provide an apparatus and a method for biological treatment of organic wastewater where it is possible to reduce the amount of air for aerobic biotreatment, and remove organic materials efficiently with a high load while greatly reducing the amount of sludge that is generated, and at the same time to maintain the stable water quality of the treated water.

Solution to Problem

In order to achieve the above-described objective, the apparatus and method for biological treatment of organic wastewater according to the present invention have the following characteristics.

(1) An apparatus for biological treatment of organic wastewater is provided with: a first biological treatment tank having a fixed-type immobilized biocarrier and an air diffusing means that is arranged on the lower side of the fixed-type immobilized biocarrier; a second biological treatment tank having an air diffusing means into which treated liquid that has been treated in the first biological treatment tank is introduced so as to be treated by means of suspended microorganisms; a sedimentation tank where solid-liquid separation is carried out on a mixed liquid that has been treated in the second biological treatment tank so that the mixed liquid is separated into sedimented sludge and treated water; an inflow line through which organic wastewater is distributed into the first biological treatment tank and the second biological treatment tank ; and a return sludge line for returning part of the sedimented sludge that has been discharged from the sedimentation tank to the second biological treatment tank.

(2) The apparatus for biological treatment of organic wastewater according to the above (1) is characterized in that the ratio Y (%) of the supply amount of organic wastewater that is supplied to the second biological treatment tank to the total supply amount of organic wastewater is set to satisfy the following formula 1 with the BOD volume load X (kg/m³/d) of the entirety of the first biological treatment tank and the second biological treatment tank being in a range of 0.5 or greater and less than 0.814, and to satisfy the following formula 2 with X being in a range of 0.814 or greater and 1.5 or less:

$5 \leq Y < -63X+82.5$ (Formula 1)

$5 \leq Y < -20X+47.5$ (Formula 2)

(3) The apparatus for biological treatment of organic wastewater according to the above (1) is characterized by further having: a first BOD measuring means for measuring the BOD value in organic wastewater; a second BOD measuring means for measuring the soluble BOD value of the treated liquid within the second biological treatment tank; and an adjustment means for adjusting the distribution amounts of organic wastewater that is to be distributed to the first biological treatment tank and the second biological treatment tank in such a manner that the ratio of the soluble BOD value in the second biological treatment tank to the BOD value of organic wastewater is in a range from 6.7% to 30% on the basis of the measured values by the first and second BOD measurement means.

(4) The apparatus for biological treatment of organic wastewater according to any of the above (1) through (3) is characterized in that a flow-blocking wall for preventing the flow of organic wastewater is arranged in the first biological treatment tank.

(5) The apparatus for biological treatment of organic wastewater according to any of the above (1) through (4) is characterized in that a stirring means for stirring the treated liquid is provided in the second biological treatment tank.

(6) A method for biological treatment of organic wastewater is provide with: a first biological treatment step for treating organic wastewater with a fixed-type immobilized biocarrier; a second biological treatment step for treatment by means of suspended microorganisms that is carried out on the introduced liquid that has been treated in the first biological treatment step; and a sedimentation step for solid-liquid separation of the mixed liquid that has been treated in the second biological treatment step so that the mixed liquid is separated into sedimented sludge and treated water, wherein the introduced organic wastewater is distributed separately in the first biological treatment step and the second biological treatment step, and part of the sedimented sludge that is discharged from the sedimentation step is returned to the second biological treatment step.

(7) The method for biological treatment of organic wastewater according to the above (6) is characterized in that the ratio Y (%) of the supply amount of organic wastewater that is supplied in the second biological treatment step to the total supply amount of organic wastewater is set to satisfy the following formula 1 with the BOD volume load X (kg/m³/d) of the entirety of the first biological treatment tank and the second biological treatment tank being in a range of 0.5 or greater and less than 0.814, and to satisfy the following formula 2 with X being in a range of 0.814 or greater and 1.5 or less:

$5 \leq Y < -63X+82.5$ (Formula 1)

$5 \leq Y < -20X+47.5$ (Formula 2)

(8) The method for biological treatment of organic wastewater according to the above (6) is characterized in that the distribution amounts of organic wastewater that are to be distributed in the first biological treatment step and the second biological treatment step are adjusted so that the ratio of the soluble BOD value of the treated liquid in the second biological treatment step to the BOD value of organic wastewater is in a range from 6.7% to 30%.

Advantageous Effects of the Invention

In the apparatus and method for biological treatment of organic wastewater according to the present invention, the treatment of organic materials with a high load is possible, and treated water of which the BOD and SS are extremely low can be gained after the sedimentation step. Concretely, a majority of organic wastewater is treated in the reaction tank that is filled in with a fixed-type immobilized biocarrier in the first biological treatment step, and at the same time, part of the organic wastewater is introduced into the suspended microorganism treatment tank in the second biological treatment step with the sludge returned from the sedimentation step being introduced, and thereby, the soluble BOD that has remained after the first biological treatment step is biologically decomposed, and at the same time, bacteria that cannot be completely flocked in the first biological treatment step can be adhesive captured with the suspending sludge.

DESCRIPTION OF EMBODIMENTS

In the following, the apparatus and method for biological treatment of organic wastewater according to the present invention are concretely described.

Figure 1:
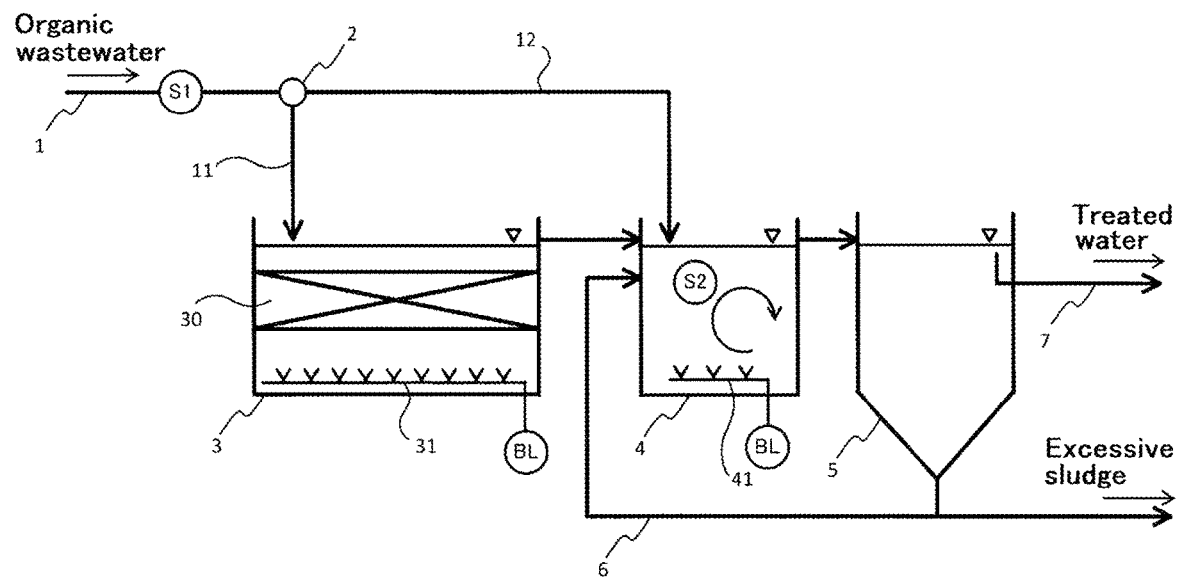
FIG. 1 is a diagram showing the schematics of the apparatus for biological treatment of organic wastewater according to the present invention (first mode)
Figure 2:
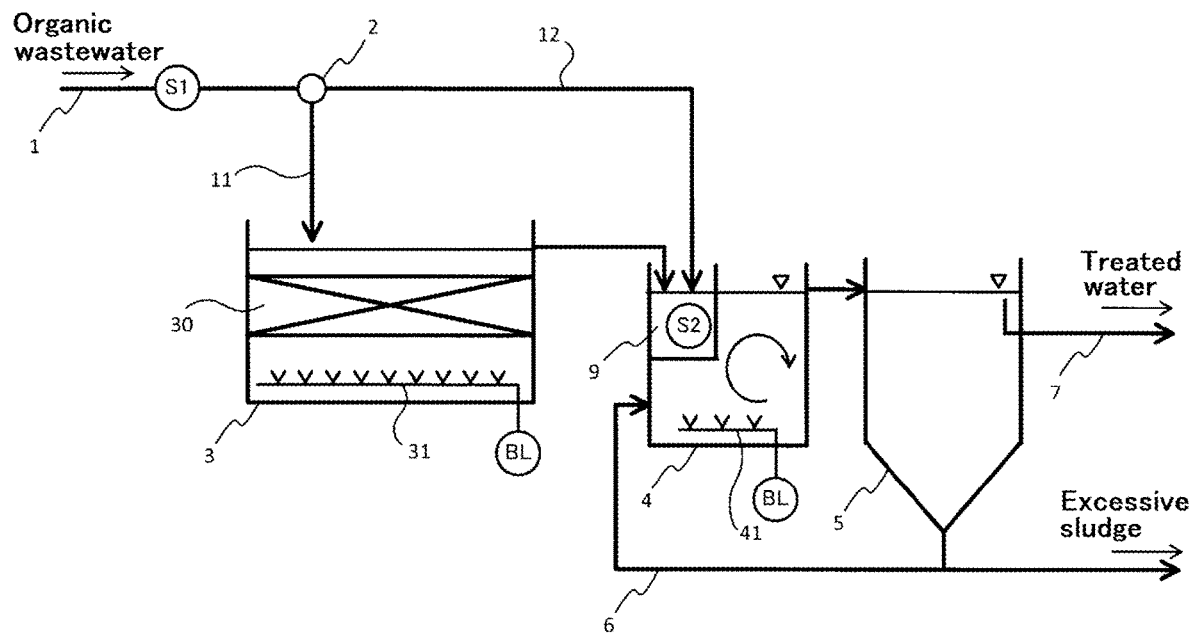
FIG. 2 is a diagram showing the schematics of the apparatus for biological treatment of organic wastewater according to the present invention (second mode)

As shown in FIGS. 1 and 2, the apparatus for biological treatment of organic wastewater according to the present invention is characterized by being provided with: a first biological treatment tank 3 having a fixed-type immobilized biocarrier 30 and an air diffusing means 31 that is arranged on the lower side of the fixed-type immobilized biocarrier; a second biological treatment tank 4 having an air diffusing means 41 into which treated liquid that has been treated in the first biological treatment tank is introduced so as to be treated by means of suspended microorganisms; a sedimentation tank 5 for carrying out solid-liquid separation on a mixed liquid that has been treated in the second biological treatment tank so that the mixed liquid is separated into sedimented sludge and treated water; an inflow line (11, 12) for distributing the introduced organic wastewater into the first biological treatment tank 3 and the second biological treatment tank 4; and a return sludge line 6 for returning part of the sedimented sludge that has been discharged from the sedimentation tank 5 to the second biological treatment tank 4.

In the method for biological treatment of organic wastewater according to the present invention, the process that is carried out in the first biological treatment tank corresponds to the "first biological treatment step," the process that is carried out in the second biological treatment tank corresponds to the "second biological treatment step," and the process that is carried out in the above-described sedimentation tank corresponds to the "sedimentation step," respectively.

Solely in the first biological treatment tank that is used in the present invention (treatment step), the BOD removal ratio is 80% or greater with the BOD volume load being 0.5 kg/m$^3$/d through 3 kg/m$^3$/d, and the BOD removal ratio is 90% or greater with the BOD volume load being 0.75 kg/m$^3$/d through 1.5 kg/m$^3$/d; however, in the sedimentation step, microscopic particles and bacteria flow out into the treated water in the sedimentation step even if the sedimentation step is provided in the later stage, and thus, further improvement of the quality of the treated water becomes necessary for practice. As for the first biological treatment tank, the second biological treatment tank and the sedimentation tank in the present invention, the configuration is not limited to that where each tank is formed of one container, and includes those where a plurality of containers are connected to each other in series or in parallel through pipes.

The process in the second biological treatment tank that is used in the present invention (treatment step) is in accordance with a biological treatment method, which is a so-called activated sludge method using conventional suspending sludge where the BOD volume load for generating sludge having good sedimentary properties in the sedimentation step is 0.1 kg/m$^3$/d through 0.5 kg/m$^3$/d, preferably the BOD volume load is 0.1 kg/m$^3$/d through 0.3 kg/m$^3$/d. Furthermore, in order for the suspending sludge to form a good flock in the sedimentation step with good sedimentary properties, the MLSS in the second biological treatment tank may be maintained at 1000 mg/L through 2000 mg/L, preferably 1000 mg/L through 1500 mg/L.

In the case where organic wastewater is distributed and treated throughout the entire system formed of the first biological treatment tank (treatment step), the second biological treatment tank (treatment step) and the sedimentation tank (sedimentation step) in accordance with the present invention, the BOD volume load in the entirety of all the biological reaction tanks in the first biological treatment step and the second biological treatment step can be set to 0.5 kg/m$^3$/d through 1.5 kg/m$^3$/d in order to make possible the treatment with the BOD removal ratio being 80% or greater. In the case where the BOD volume load is set to 0.6 kg/m$^3$/d through 0.9 kg/m$^3$/d, a treatment performance with the BOD removal ratio being 95% or greater can be exercised.

In this case, the adjustment of the distribution amounts of organic wastewater in the first biological treatment step and the second biological treatment step becomes extremely important.

The adjustment of the distribution amounts of organic wastewater in the present invention is carried out in the flow amount adjusting mechanism denoted by 2 in FIGS. 1 and 2. The supply line 1 for organic wastewater (raw water) is branched through the flow amount adjusting mechanism 2 so as to form distribution lines (11, 12).

A sensor S1 for measuring the BOD concentration in the raw water and a sensor S2 for measuring the BOD concentration within the second biological treatment tank are provided.

As shown in FIG. 2, a space that surrounds the portion where the flows of the treated water from the first biological treatment tank and organic wastewater (raw water) merge is provided (an opening for the connection to the inside of the second biological treatment tank is created in a portion of the partition that creates the space) in order to prevent the returned sludge from affecting the sensor S2, and thus, a water quality measuring unit 9 is formed.

Figure 4:
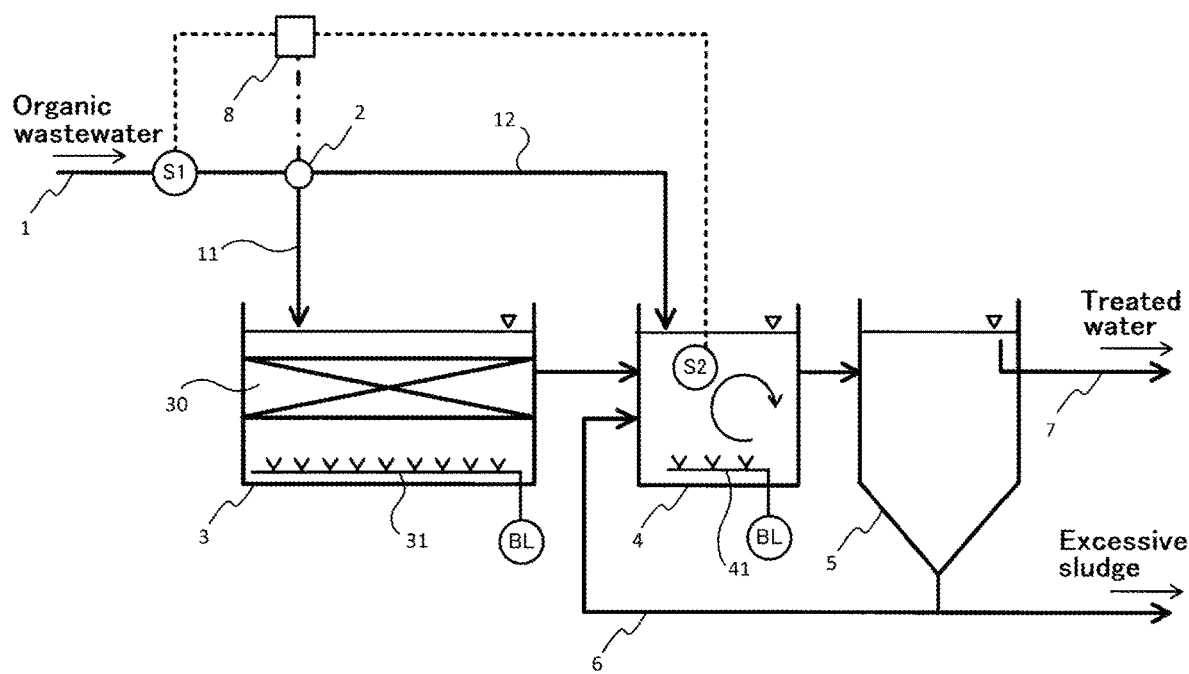
FIG. 4 is a diagram showing the schematics of the apparatus for biological treatment of organic wastewater according to the present invention (fourth mode)
Figure 5:
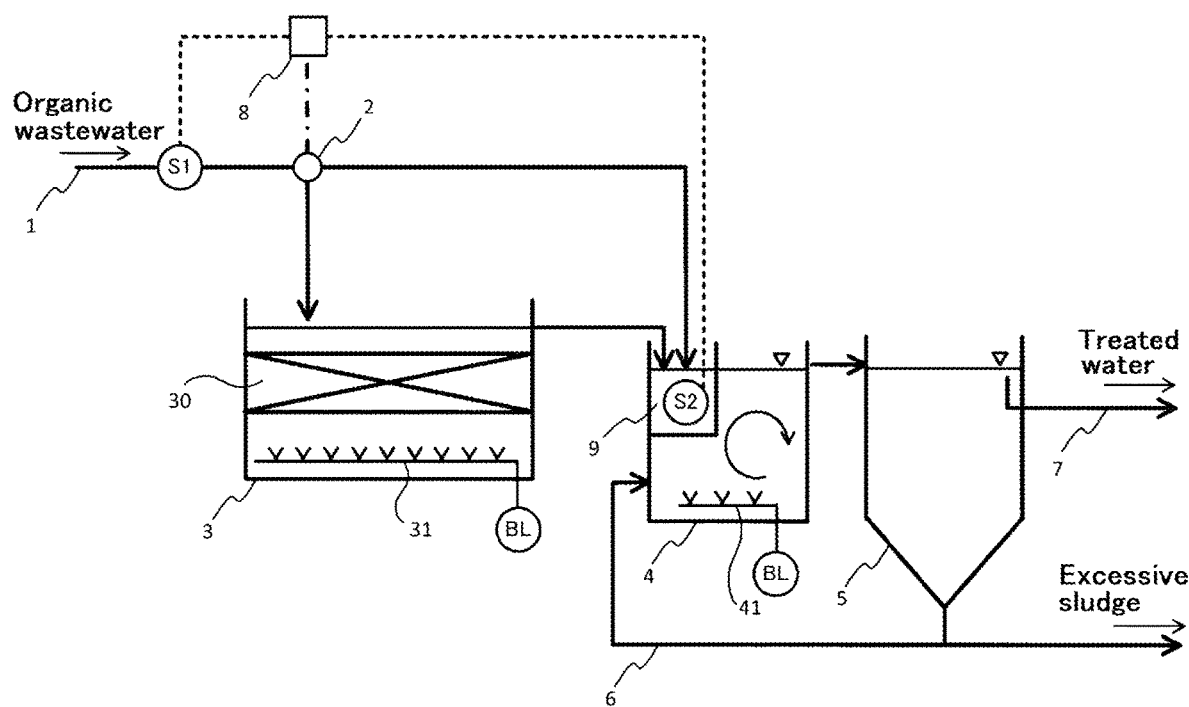
FIG. 5 is a diagram showing the schematics of the apparatus for biological treatment of organic wastewater according to the present invention (fifth mode)

It is possible for the operator to adjust the flow amount adjusting mechanism 2 when viewing the numerical values of the measurement results from the sensors S1 and S2. As shown in FIGS. 4 and 5, it is also possible to form an adjusting means where the measurement results are inputted into the control device 8 so that the flow amount adjusting mechanism can be controlled automatically.

The fixed-type immobilized biocarrier 30 with which the first biological treatment tank is filled in is an aggregate of individual carriers. As for the form of the carriers, as shown in Patent Literature 4 and Non-Patent Literature 1, it is preferable for the carriers to have any of the forms that can be generally used such as wave plates, honeycomb tubes, bottle shapes, cylindrical shapes, net shapes, ball shapes and sea urchin shapes. Those shapes make it possible for microorganisms to adhere to the surface of the carriers so that the microorganisms can proliferate in accordance with the load of each tank, and thus, the organic materials within the tank can be efficiently treated.

In the case where the raw water includes suspended solids (SS) and too great of an amount of the SS adhere and reside on the carriers, the portion within the tank that is filled with the fixed-type immobilized biocarrier may be clogged. Therefore, it is preferable to select the carriers where the clogging by SS is prevented due to the sufficient pore openings. From among the above-described shapes of the carriers, cylindrical shapes, net shapes, ball shapes and sea urchin shapes can be preferably selected due to their sufficient pore openings.

It is necessary to devise the tank so that carriers do not flow out from the fixed-type immobilized biocarrier that is arranged within the tank due to the aeration or the wastewater that flows in or out in the first biological treatment step. Concretely, a support in a net form with large openings is provided in the reaction tank for the first biological treatment step, the portion above this support is filled in with the fixed-type immobilized biocarrier, and furthermore, a net with large openings or a plate with pores is provided on the upper surface of the filled portion so that the carriers can be prevented from flowing out due to aeration or the like. In the case where high load treatment is aimed from the technical point of view, it is important for the ratio of filling with the fixed-type immobilized biocarrier in the first biological treatment step to be 50% at the lowest, and preferably 60% to 70%. Here, the fixed-type immobilized biocarrier in the present invention may not be limited to the one that is arranged and fixed within the biological treatment tank, but also includes one that is formed in such a manner that the carriers make close contact with each other so as not to flow easily.

In the first biological treatment tank, an air diffusing means 31 for supplying air that includes oxygen is arranged on the lower side of the fixed-type immobilized biocarrier 30. The air that has been released from the air diffusing means is prevented from spreading upwards and being released easily to the outside by the fixed-type immobilized biocarrier, and thus, the amount of air that stays within the liquid to be treated increases. As a result, the efficiency of oxygen being dissolved is higher than in the case where the fluidized bed-type carriers in Patent Literature 2 and 3 are used. In addition, in the case where the fixed-type immobilized biocarrier is used, air that is used as the power source for moving the fluidized bed-type carriers in Patent Literature 2 and 3 becomes unnecessary, and thus, it becomes possible to greatly reduce the amount of air that is required for the treatment of organic wastewater.

Next, a method where the characteristics of the first biological treatment step can be actively used can be adopted for the start-up of the apparatus for biological treatment of organic wastewater in accordance with the present invention.

In accordance with the first method, the tank is filled in with the raw water in the first biological treatment step, and the treated liquid is held within the tank during the period where the treatment is carried out well. During this initial period, the total amount of raw water is treated through the distribution lines in the second biological treatment step.

As the treatment in the first biological treatment step starts up, the amount of raw water may be gradually increased on the side where the first biological treatment step is carried out.

The second method is a method for treating a majority of the raw water in the second biological treatment tank where the sludge that has been returned from the sedimentation tank to the second biological treatment tank is again returned to the first biological treatment tank as seed sludge, while part of the raw water is being treated in the first biological treatment tank in such a state that the supply of the raw water into the first biological treatment tank is reduced.

In the case where the system has become a steady state, the amount of distributed raw water may be greater in the first biological treatment step than in the second biological treatment step. It is preferable for the distribution ratio of the raw water in the first biological treatment step to be in a range from 70% to 95% of the total amount of raw water. The distribution ratio of the raw water is defined as the ratio of the amount of raw water that is distributed in the first biological treatment step to the total amount of raw water or the ratio of the amount of raw water that is distributed in the second biological treatment step.

Figure 3:
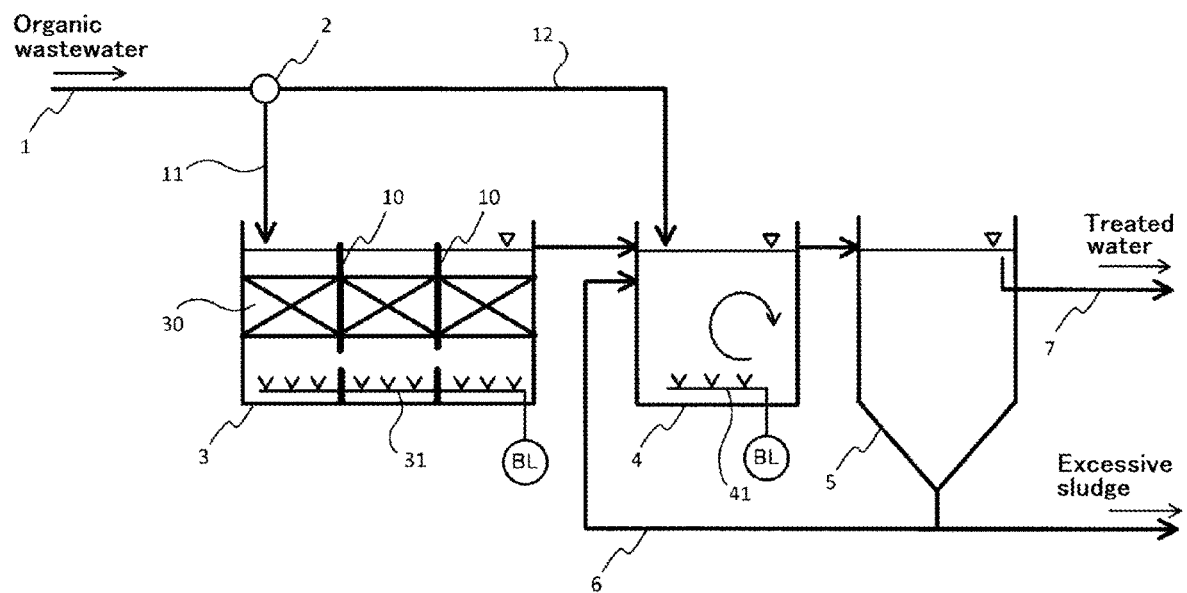
FIG. 3 is a diagram showing the schematics of the apparatus for biological treatment of organic wastewater according to the present invention (third mode)

FIG. 3 shows an example of a first biological treatment tank where a flow blocking wall 10 is installed.

The first biological treatment tank has a portion that is filled in with a fixed-type immobilized biocarrier and a portion without a carrier, and the fluid resistance is different between the two spaces. The raw water mainly passes through the portion without a carrier of which the fluid resistance is lower, and as a result, the contact between the raw water and the carrier becomes insufficient.

In order to avoid the flowing out of the raw water into the second biological treatment tank while being insufficiently treated, that is to say, in order to make the contact between the raw water and the carrier be efficient in the first biological treatment tank for sufficient treatment, it is important to provide the flow-blocking wall 10 within the first biological treatment tank. In the case where the raw water easily flows on the lower side of the fixed-type immobilized biocarrier 30 in the lateral direction, in particular, the installment of a flow-blocking wall is important.

The flow-blocking wall may be anything that can provide resistance in the flow of the raw water, and a partitioner with openings, a protrusion arranged on the bottom of the treatment tank, and the like can be used.

In the second biological treatment tank shown in FIGS. 1 through 5, an air-diffusing means 41 is arranged within the treatment tank.

In the case where the BOD load amount is small in the second biological treatment tank, or in the case where the amount of aeration is large and the dissolved oxygen concentration exceeds 2 mg/L, nitrogen in the form of ammonia that is included in the organic wastewater is oxidized so as to generate $NO_2$-N (nitrogen in the form of nitrous acid) or $NO_3$-N (nitrogen in the form of nitric acid), which may make the sludge suspend in the sedimentation tank, increase the concentration of the SS in the treated water, or increase the BOD concentration, and thus, in some cases, the standard value for the release of the wastewater cannot be satisfied.

In order to prevent $NO_2$-N (nitrogen in the form of nitrous acid) or $NO_3$-N (nitrogen in the form of nitric acid) from being generated in the second biological treatment tank, it is important to maintain the second biological treatment tank in a non-oxygen state (in a state where substantially no oxygen is dissolved) in order to stop the oxidization of nitrogen in the form of ammonia.

Figure 7:
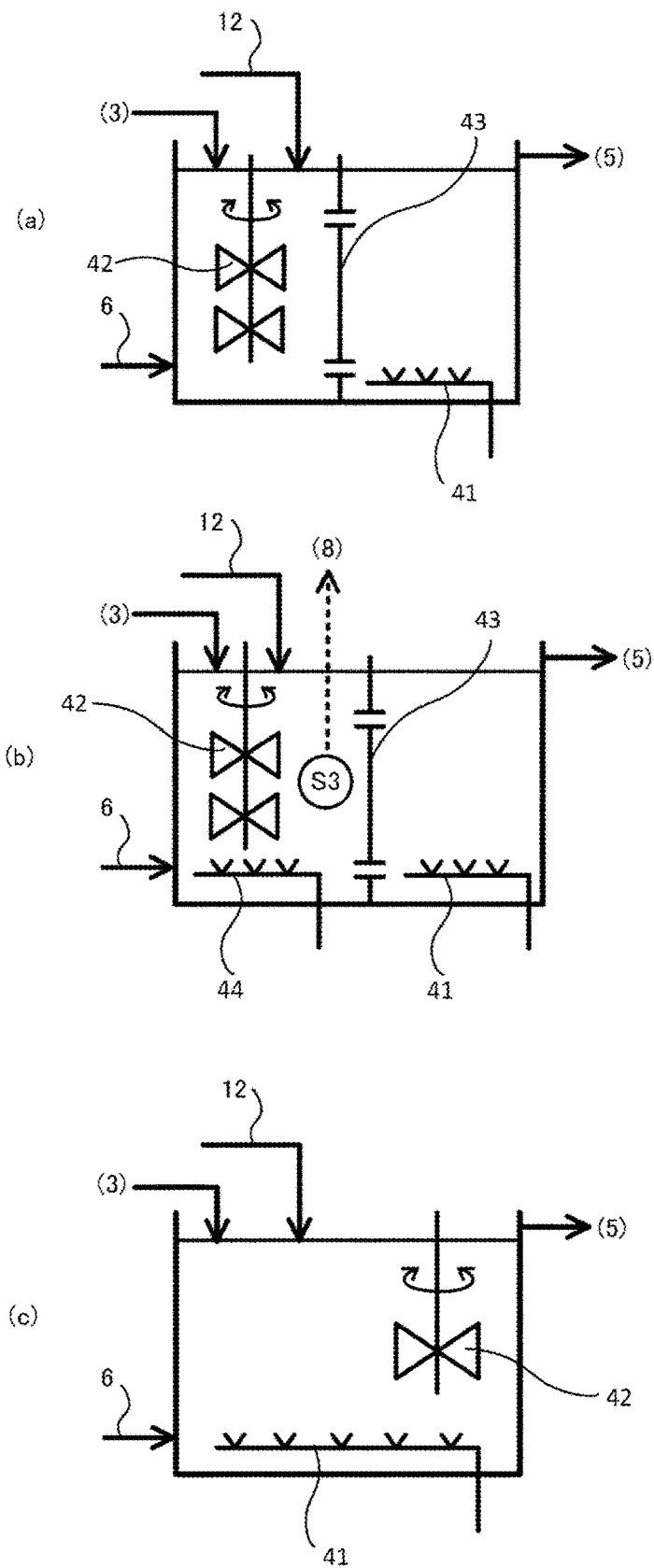
FIG. 7 is a diagram showing an application example of the second biological treatment tank that is used in the apparatus for biological treatment of organic wastewater according to the present invention.

In order to do this, as shown in FIG. 7, a stirring means 42 is arranged within the treatment tank so that microorganisms can be in a suspending state for biologically denitrifying treatment by means of the BOD in the distributed organic wastewater. As a result of the denitrifying treatment, the aerobic sludge retention time (ASRT) that is required for the proliferation of nitrifying bacteria that generates $NO_2$-N (nitrogen in the form of nitrous acid) or $NO_3$-N (nitrogen in the form of nitric acid) is made shorter, and thus, the generation of $NO_2$-N or $NO_3$-N can be prevented due to the suppression of the proliferation of nitrifying bacteria.

Here, "(3)" in FIG. 7 is a treated liquid introduced from the first biological treatment tank 3, "(5)" is the treated liquid that is directed towards the sedimentation tank 5, and "6" is a return sludge line for the inflow into the second biological treatment tank.

FIG. 7(*a*) shows a treatment tank within which a partition 43 with openings is provided so that the wastewater can be mixed by means of a stirring means 42 without oxygen in the tank on the upstream side, and after that, BOD treatment through aeration can be carried out by using an air-diffusing means 41. The manner of the treatment is not limited to this, and the arrangement of the stirring means 42 above an air-diffusing means 44 in the upstream-side tank is also possible as shown in FIG. 7(*b*). In order to adjust the amount of air from the air-diffusing means 44, it is preferable for the value of the dissolved oxygen concentration gauge (sensor S3) to be appropriate for the control of the rotation numbers of the air blower for blowing air to the air-diffusing means 44 in order to adjust the amount of air from the air-diffusing means 44. In this case, the concentration of the dissolved oxygen is 0.5 mg/L or less, and is preferably 0.3 mg/L or less. Here, the dotted-line arrow pointing to "(8)" in FIG. 7(*b*) means that the signal from the sensor S3, which is the dissolved oxygen concentration gauge, is transmitted to the control device 8.

As shown in FIG. 7(c), it is also possible to carry out treatment in the low dissolved oxygen state by providing an air-diffusing means 41 and a stirring means 42 without providing a partition within the second biological treatment tank. The quality of the treated water becomes excellent when it takes two hours or more to treat the total amount of water of the distributed organic wastewater and the liquid that has flowed out from the first biological treatment tank.

EXAMPLE 1

An experiment was carried out where the ratio of the flow amount into the second biological treatment tank to the organic wastewater (raw water), that is to say, the ratio of distribution of the raw water into the second biological treatment tank, was varied. FIG. 1 shows the mode in terms of the BOD volume load of the entirety of the system and the respective distribution ratios of the raw water. In the following examples, the distribution ratio of the raw water into the second biological treatment tank is simply referred to as "raw water distribution ratio."

The organic wastewater, which was the raw water in the present treatment system, was 72 $m^3/d$, and the BOD concentration thereof was 150 mg/L.

Treatment was carried out in the first biological treatment step using the fixed-type immobilized biocarrier with which the tank was filled in (hereinafter, referred to as first step) and in the second biological treatment step, which was suspended microorganism treatment for the sludge returned from the sedimentation step (hereinafter, referred to as second step), and solid-liquid separation was carried out in the sedimentation step for the treatment of the raw water.

In the sedimentation step, solid-liquid separation was carried out in a gravitation-type sedimentation pond with a separation rate of 20 $m^3/m^2/d$ per water area, and the quality of the treated water was evaluated.

The measurements of the BOD concentrations and the S-BOD (soluble BOD) values in RUN 1 through RUN 7 followed the official method JIS-K0102 version 2016.

As for the evaluation method for the results, the evaluation was made based on the level of achievement of the target value, which is concretely described as follows.

The generated SS concentration value that was estimated from the BOD conversion was regarded as 66% of the BOD. In this case, the concentration of the generated SS was 100 mg/L since the BOD was 150 mg/L.

1) In the case where the BOD removal ratio was 95% or greater and the SS was 10 mg/L or less, the evaluation was "very satisfactory," which was denoted as ○. In the case where the SS was 10 mg/L or less, the estimated removal ratio was 90% or greater.

2) In the case where the BOD removal ratio was 80% or greater and less than 95% and the SS was 20 mg/L or less, the evaluation was "satisfactory," which was denoted as Δ. In the case where the SS was 20mg/L or less, the estimated removal ratio was 80% or greater.

3) In the case where the BOD removal ratio was less than 80% irrelevant of the SS concentration, the evaluation was "unsatisfactory," which was denoted as ×.

TABLE 1

Example 1 [RUN 1 through RUN 7]
Amount of raw water to be treated: 72 m3/d, BOD concentration raw water: 150 mg/L

| RUN and tank volume | Raw water distribution ratio (%) Into first step | Raw water distribution ratio (%) Into second step | BOD volume load (kg/m3/d) Entire system | BOD volume load (kg/m3/d) First step | BOD volume load (kg/m3/d) Second step | Treated water BOD concentration (mg/L) | Treated water SS concentration (mg/L) | BOD removal ratio (%) | Evaluation (Note 2) |
|---|---|---|---|---|---|---|---|---|---|
| Control of RUN 1 | 100 | 0 | 0.5 | 0.98 | 0.00 | 22.5 | 50 | 85 | — |
| RUN1 | 95 | 5 | | 0.93 | 0.05 | 16.5 | 17 | 89 | Δ |
| Tank volume(m3) | 90 | 10 | | 0.88 | 0.10 | 7 | 10 | 95 | ○ |
| First(Note 1); 11 m3 | 85 | 15 | | 0.83 | 0.15 | 7 | 10 | 95 | ○ |
| Second(Note 1); 11 m3 | 80 | 20 | | 0.79 | 0.20 | 7 | 8 | 95 | ○ |
| | 75 | 25 | | 0.74 | 0.25 | 6 | 8 | 96 | ○ |
| | 70 | 30 | | 0.69 | 0.29 | 6 | 7 | 96 | ○ |
| | 65 | 35 | | 0.65 | 0.35 | 12 | 7 | 92 | Δ |
| | 60 | 40 | | 0.60 | 0.40 | 15 | 9 | 90 | Δ |
| | 55 | 45 | | 0.55 | 0.45 | 23 | 14 | 85 | Δ |
| | 50 | 50 | | 0.50 | 0.50 | 29 | 18 | 81 | Δ |
| | 45 | 55 | | 0.45 | 0.55 | 38 | 24 | 75 | × |
| Control of RUN 2 | 100 | 0 | 0.6 | 1.20 | 0.00 | 22.5 | 50 | 85 | — |
| RUN2 | 95 | 5 | | 1.14 | 0.06 | 16.5 | 15 | 89 | Δ |
| Tank volume(m3) | 90 | 10 | | 1.08 | 0.12 | 7 | 10 | 96 | ○ |
| First; 9 m3 | 85 | 15 | | 1.02 | 0.18 | 7 | 10 | 96 | ○ |
| Second; 9 m3 | 80 | 20 | | 0.96 | 0.24 | 6 | 8 | 96 | ○ |
| | 75 | 25 | | 0.90 | 0.30 | 6 | 7 | 96 | ○ |
| | 70 | 30 | | 0.84 | 0.36 | 12 | 7 | 92 | Δ |
| | 65 | 35 | | 0.78 | 0.42 | 17 | 10 | 89 | Δ |
| | 60 | 40 | | 0.72 | 0.48 | 26 | 16 | 83 | Δ |
| | 55 | 45 | | 0.66 | 0.54 | 39 | 25 | 74 | × |
| Control of RUN 3 | 100 | 0 | 0.7 | 1.42 | 0.00 | 22.5 | 50 | 85 | — |
| RUN3 | 95 | 5 | | 1.35 | 0.07 | 16.5 | 14 | 89 | Δ |
| Tank volume(m3) | 90 | 10 | | 1.27 | 0.14 | 7 | 8 | 96 | ○ |
| First; 7.8 m3 | 85 | 15 | | 1.20 | 0.21 | 6 | 7 | 96 | ○ |
| Second; 7.8 m3 | 80 | 20 | | 1.10 | 0.28 | 6 | 6 | 96 | ○ |
| | 75 | 25 | | 1.05 | 0.36 | 12 | 7 | 92 | Δ |
| | 70 | 30 | | 0.98 | 0.43 | 18 | 11 | 88 | Δ |
| | 65 | 35 | | 0.90 | 0.48 | 24 | 15 | 84 | Δ |
| | 60 | 40 | | 0.83 | 0.55 | 39 | 25 | 74 | |

TABLE 1-continued

Example 1 [RUN 1 through RUN 7]
Amount of raw water to be treated: 72 m3/d, BOD concentration raw water: 150 mg/L

| RUN and tank volume | Raw water distribution ratio (%) Into first step | Raw water distribution ratio (%) Into second step | BOD volume load (kg/m3/d) Entire system | BOD volume load (kg/m3/d) First step | BOD volume load (kg/m3/d) Second step | Treated water BOD concentration (mg/L) | Treated water SS concentration (mg/L) | BOD removal ratio (%) | Evaluation (Note 2) |
|---|---|---|---|---|---|---|---|---|---|
| Control of RUN 4 | 100 | 0 | 0.8 | 1.71 | 0.00 | 22.5 | 50 | 85 | — |
| RUN4 | 95 | 5 |  | 1.63 | 0.09 | 16.5 | 14 | 89 | Δ |
| Tank volume(m3) | 90 | 10 |  | 1.54 | 0.17 | 6 | 10 | 96 | ○ |
| First; 6.8 m3 | 85 | 15 |  | 1.46 | 0.26 | 5 | 10 | 97 | ○ |
| Second; 6.8 m3 | 80 | 20 |  | 1.37 | 0.34 | 10.5 | 10 | 93 | Δ |
|  | 75 | 25 |  | 1.30 | 0.43 | 23 | 15 | 85 | Δ |
|  | 70 | 30 |  | 1.20 | 0.51 | 27 | 18 | 80 | Δ |
|  | 65 | 35 |  | 1.03 | 0.56 | 42 | 27 | 72 | x |
| RUN5 | 95 | 5 | 0.9 | 1.70 | 0.09 | 16.5 | 12 | 89 | Δ |
| Tank volume(m3) | 90 | 10 |  | 1.60 | 0.18 | 6 | 9 | 96 | ○ |
| First; 6 m3 | 85 | 15 |  | 1.50 | 0.27 | 6 | 10 | 96 | ○ |
| Second; 6 m3 | 80 | 20 |  | 1.40 | 0.36 | 23 | 10 | 85 | Δ |
|  | 75 | 25 |  | 1.40 | 0.45 | 28 | 10 | 81 | Δ |
|  | 70 | 30 |  | 1.30 | 0.54 | 31 | 15 | 79 | x |
| Control of RUN 6 | 100 | 0 | 1.0 | 2.00 | 0.00 | 30 | 30 | 80 | — |
| RUN6 | 95 | 5 |  | 1.90 | 0.10 | 22 | 14 | 85 | Δ |
| Tank volume(m3) | 90 | 10 |  | 1.80 | 0.20 | 21 | 15 | 86 | Δ |
| First; 5.4 m3 | 85 | 15 |  | 1.70 | 0.30 | 28 | 16 | 81 | Δ |
| Second; 5.4 m3 | 80 | 20 |  | 1.60 | 0.40 | 27 | 15 | 82 | Δ |
|  | 75 | 25 |  | 1.50 | 0.50 | 21 | 18 | 86 | Δ |
|  | 70 | 30 |  | 1.40 | 0.60 | 32 | 25 | 79 | x |
| Control of RUN 7 | 100 | 0 | 1.5 | 3.00 | 0.00 | 30 | 16 | 80 | — |
| RUN7 | 95 | 5 |  | 2.90 | 0.15 | 22 | 18 | 85 | Δ |
| Tank volume(m3) | 90 | 10 |  | 2.70 | 0.30 | 29 | 18 | 81 | Δ |
| First; 3.6 m3 | 85 | 15 |  | 2.60 | 0.45 | 29 | 20 | 81 | Δ |
| Second; 3.6 m3 | 80 | 20 |  | 2.40 | 0.60 | 63 | 80 | 58 | x |

Note 1)
First(m3): This means the first biological treatment step (m3).
Note)
Second(m3): This means the second biological treatment step (m3).
Note 2)
Evaluation: The level of achievement of the target value is regarded as the evaluation, which is concretely described as follows.
○: "Very satisfactory" with the BOD removal ratio being 95% or greater and the SS being 10 mg/L or less.
Δ: "Satisfactory" with the BOD removal ratio being 80% or greater and less than 95% and the SS concentration being 20 mg/L or less.
x: "Unsatisfactory" with the BOD removal ration being less than 80% irrelevant of the SS concentration.

The experiment was first carried out through seven RUNs (RUN 1 through RUN 7) where the volumes of the respective tanks in the first step and in the second step were varied without changing the sedimentation step as shown in Table 1 in such a manner that the BOD volume load of the entirety of the treatment system for the total volume in the first step and in the second step (hereinafter, referred to as the BOD load of the entire system) varied from 0.5 kg/m³/d to 1.5 kg/m³/d. The treated water was evaluated by varying the raw water distribution ratio into the first step and the second step by five points for each RUN.

The volume of the tank in the first step and in the second step was adjusted in accordance with the load, and the volume thereof is shown in Table 1 for each RUN. The fixed-type immobilized biocarrier used in the first step has a space inside in such a manner that a basket with a large mesh size was fixed with upper and lower support materials. The volume of the fulfillment with the fixed-type immobilized biocarrier was 60% of the volume of the tank used in the first step (reaction tank). The MLSS concentration in the second step (the concentration of bacteria residing in the treatment tank) was adjusted to 1000 mg/L. Table 1 shows the above together with the experiment results.

In RUN 1, the tank volume was 11 m³ in the first step and 11 m³ in the second step, while the BOD load of the entire system was 0.5 kg/m³/d.

First, the raw water distribution ratio was set to 5%. Then, the raw water amount in the second step became 3.6 m³, and the BOD load in the second step was 0.05 kg/m³/d. At this time when the raw water distribution ratio was 5%, the BOD concentration of the treated water after the sedimentation step was 16.5 mg/L, the removal ratio was 89%, and the SS concentration was 17 mg/L with an evaluation of "satisfactory (Δ)."

Next, the raw water distribution ratio was increased to 10%, 15%, 20%, 25%, and 30%, the amount of raw water in the second step increased from 7.2 m³ to 21.6 m³ in increments of 3.6 m³. The BOD load in the second step was a value from 0.1 through 0.29 kg/m³/d in accordance with the distribution ratio.

At this time when the raw water distribution ratio was any of a value of 10%, 15%, 20%, 25%, or 30%, the BOD concentration of the treated water after the sedimentation step was 6 to 7 mg/L, the BOD removal ratio was 95% to 96%, and the SS concentration was 7 to 10 mg/L with an evaluation of "very satisfactory (○)."

When the raw water distribution ratio was increased to 35%, 40%, 45%, and 50%, the amount of raw water in the second step increased from 25.2 m³ to 36 m³. The BOD load in the second step was 0.35 through 0.50 kg/m³/d in accordance with the distribution ratio.

At this time when the raw water distribution ratio was any of 35%, 40%, 45%, or 50%, the BOD concentration of the treated water after the sedimentation step was 12 through 29 mg/L, the BOD removal ratio was 81 to 92%, and the SS concentration was 7 through 18 mg/L with an evaluation of "satisfactory."

Furthermore, the raw water distribution ratio was set to 55%, and then, the amount of the raw water in the second step became 39.6 m$^3$, and thus, the BOD load in the second step was 0.55 kg/m$^3$/d, which was beyond the limit of the treatment. When the raw water distribution ratio was 55%, the BOD concentration of the treated water after the sedimentation step was 38 mg/L, the removal ratio was 75%, and the SS concentration was 24 mg/L with an evaluation of "unsatisfactory (×)."

In RUN 2, the tank volume was 9 m$^3$ in the first step and 9 m$^3$ in the second step, while the BOD load of the entire system was set to 0.6 kg/m$^3$/d.

First, the raw water distribution was set to 5%, and then, the amount of the raw water in the second step was 3.6 m$^3$ and the BOD load in the second step was 0.06 kg/m$^3$/d. When the raw water distribution ratio was 5% in RUN 2, the BOD concentration of the treated water after the sedimentation step was 16.5 mg/L, the removal ratio was 89%, and the SS concentration was 15 mg/L with an evaluation of "satisfactory."

Next, the raw water distribution ratio was increased to 10%, 15%, 20% and 25%. Then, the amount of the raw water in the second step increased from 7.2 m$^3$ to 18 m$^3$ in increments of 3.6 m$^3$. The BOD load in the second step was 0.12 through 0.30 kg/m$^3$/d in accordance with the distribution ratio.

At this time when the raw water distribution ratio was any of 10%, 15%, 20%, and 25%, the BOD concentration of the treated water after the sedimentation step was 6 to 7 mg/L, the BOD removal ratio was 96%, and the SS concentration was 7 to 10 mg/L with an evaluation of "very satisfactory."

When the raw water distribution ratio was increased to 30%, 35% and 40%, the amount of the raw water in the second step increased from 21.6 m$^3$ to 28.8 m$^3$. The BOD load in the second step was 0.36 through 0.48 kg/m$^3$/d in accordance with the distribution ratio.

At this time when the raw water distribution ratio was any of 30%, 35%, or 40%, the BOD concentration of the treated water after the sedimentation step was 12 to 26 mg/L, the BOD removal ratio was 83 to 92%, and the SS concentration was 7 to 16 mg/L with an evaluation of "satisfactory."

Furthermore, the raw water distribution ratio was set to 45%. Then, the amount of the raw water in the second step was 32.4 m$^3$, and the BOD load in the second step was 0.54 kg/m$^3$/d, which was beyond the limit of the treatment. When the raw water distribution ratio was 45%, the BOD concentration of the treated water after the sedimentation step was 39 mg/L, the removal ratio was 74%, and the SS concentration was 25 mg/L with an evaluation of "unsatisfactory."

In RUN 3, the tank volume was 8 m$^3$ in the first step and 8 m$^3$ in the second step, and the BOD load of the entire system was 0.7 kg/m$^3$/d.

First, the raw water distribution ratio was set to 5%. Then, the amount of the raw water in the second step was 3.6 m$^3$, and the BOD load in the second step was 0.07 kg/m$^3$/d. When the raw water distribution ratio was 5% in RUN 3, the BOD concentration of the treated water after the sedimentation step was 16.5 mg/L, the removal ratio was 89%, and the SS concentration was 14 mg/L with an evaluation of "satisfactory."

Next, the raw water distribution ratio was increased to 10%, 15% and 20%, the amount of the raw water in the second step increased from 7.2 m$^3$ to 14.4 m$^3$ in increments of 3.6 m$^3$. The BOD load in the second step was 0.14 to 0.27 kg/m$^3$/d in accordance with the distribution ratio.

At this time when the raw water distribution ratio was any of 10%, 15% or 20%, the BOD concentration of the treated water after the sedimentation step was 5 to 6 mg/L, the BOD removal ratio was 96%, and the SS concentration was 6 to 8 mg/L with an evaluation of "very satisfactory."

Furthermore, the raw water distribution ratio was set to 25%, 30% and 35%. Then, the amount of the raw water in the second step was 18 to 25.2 m$^3$, and the BOD load in the second step was 0.36 to 0.48 kg/m$^3$/d. When the raw water distribution ratio was any of 25%, 30% or 35% in RUN 3, the BOD concentration of the treated water after the sedimentation step was 12 to 24 mg/L, the removal ratio was 84 to 92%, and the SS concentration was 7 to 15 mg/L with an evaluation of "satisfactory."

Moreover, the raw water distribution ratio was set to 40%. Then, the amount of the raw water in the second step was 28.8 m$^3$, and the BOD load in the second step was 0.55 kg/m$^3$/d, which was beyond the limit of the treatment. When the raw water distribution ratio was 40%, the BOD concentration of the treated water after the sedimentation step was 39 mg/L, the removal ratio was 74%, and the SS concentration was 25 mg/L with an evaluation of "unsatisfactory."

In RUN 4, the tank volume was 6.8 m$^3$ in the first step and 6.8m$^3$ in the second step, and the BOD load of the entire system was 0.8 kg/m$^3$/d.

First, the raw water distribution ratio was set to 5%. Then, the amount of the raw water in the second step was 3.6 m$^3$, and the BOD load in the second step was 0.09 kg/m$^3$/d. When the raw water distribution ratio was 5% in RUN 3, the BOD concentration of the treated water after the sedimentation step was 16.5 mg/L, the removal ratio was 89%, and the SS concentration was 14 mg/L with an evaluation of "satisfactory."

Next, the raw water distribution ratio was increased to 10% and 15%, the amount of the raw water in the second step increased from 7.2 m$^3$ to 10.8 m$^3$ in increments of 3.6 m$^3$. The BOD load in the second step was 0.17 to 0.26 kg/m$^3$/d in accordance with the distribution ratios.

At this time when the raw water distribution ratio was 10% or 15%, the BOD concentration of the treated water after the sedimentation step was 5 to 6 mg/L, the BOD removal ratio was 96%, and the SS concentration was 10 mg/L with an evaluation of "very satisfactory."

When the raw water distribution ratio was set to 20%, 25% and 30%, the amount of the raw water in the second step was 14.4 to 21.6 m$^3$, and the BOD load in the second step was 0.34 to 0.5 kg/m$^3$/d. When the raw water distribution ratio was any of 20%, 25% or 30% in RUN 4, the BOD concentration of the treated water after the sedimentation step was 10.5 to 29.5 mg/L, the removal ratio was 80% to 93%, and the SS concentration was 10 to 20 mg/L with an evaluation of "satisfactory."

Furthermore, the raw water distribution ratio was set to 35%. Then, the amount of the raw water in the second step was 25.2 m$^3$, and the BOD load in the second step was 0.56 kg/m$^3$/d, which was beyond the limit of the treatment. When the raw water distribution ratio was 35%, the BOD concentration of the treated water after the sedimentation step was 42 mg/L, the removal ratio was 72%, and the SS concentration was 27 mg/L with an evaluation of "unsatisfactory."

In RUN 5, the tank volume was 6 m$^3$ in the first step and 6 m$^3$ in the second step, and the BOD load of the entire system was 0.9 kg/m$^3$/d.

First, the raw water distribution ratio was set to 5%. Then, the amount of the raw water in the second step was 3.6 m$^3$, and the BOD load in the second step was 0.09 kg/m³/d. When the raw water distribution ratio was 5% in RUN 3, the BOD concentration of the treated water after the sedimentation step was 16.5 mg/L, the removal ratio was 89%, and the SS concentration was 12 mg/L with an evaluation of "satisfactory."

Next, the raw water distribution ratio was increased to 10% and 15%, the amount of the raw water in the second step increased from 7.2 m³ to 10.8 m³. The BOD load in the second step was 0.18 to 0.27 kg/m³/d in accordance with the distribution ratio.

At this time when the raw water distribution ratio was 10% or 15%, the BOD concentration of the treated water after the sedimentation step was 6 mg/L, the BOD removal ratio was 96%, and the SS concentration was 9 to 10 mg/L with an evaluation of "very satisfactory."

Moreover, the raw water distribution ratio was set to 20% and 25%. Then, the amount of the raw water in the second step was 14.4 to 18 m³, and the BOD load in the second step was 0.36 to 0.45 kg/m³/d. When the raw water distribution ratio was 20% or 25% in RUN 5, the BOD concentration of the treated water after the sedimentation step was 23 to 28 mg/L, the removal ratio was 81 to 85%, and the SS concentration was 10 mg/L with an evaluation of "satisfactory."

In the case where the raw water distribution ratio was set to 30%, the amount of the raw water in the second step was 21.6 m³, and the BOD load in the second step was 0.54 kg/m³/d. The BOD concentration of the treated water after the sedimentation step was 31 mg/L, the removal ratio was 79%, and the SS concentration was 15 mg/L with an evaluation of "unsatisfactory."

As described in the above, a biological treatment method, which is a so-called activated sludge method using conventional suspending sludge, was used in the second biological treatment tank (treatment step) used in the present invention, and the BOD volume load for generating sludge having good sedimentary properties in the sedimentation step was 0.1 kg/m³/d to 0.5 kg/m³/d, preferably the BOD volume load was 0.1 kg/m³/d to 0.3 kg/m³/d.

In the case where the BOD load exceeds 0.5 kg/m³/d in the second step, the treatment capacity in this system was overburdened. Therefore, it is important to set the BOD load to 0.5 kg/m³/d or less in the second step.

In RUN 6, the tank volume was 5.4 m³ in the first step and 5.4 m³ in the second step, and the BOD load of the entire system was 1.0 kg/m³/d.

First, the raw water distribution ratio was set to 5%. Then, the amount of the raw water in the second step was 3.6 m³, and the BOD load in the second step was 0.1 kg/m³/d. When the raw water distribution ratio was 5% in RUN 6, the BOD concentration of the treated water after the sedimentation step was 22 mg/L, the removal ratio was 85%, and the SS concentration was 14 mg/L with an evaluation of "satisfactory."

Next, the raw water distribution ratio was increased to 10%, 15%, 20% and 25%, the amount of the raw water in the second step increased from 7.2 m³ to 18 m³. The BOD load in the second step was 0.2 to 0.5 kg/m³/d in accordance with the distribution ratio.

At this time when the raw water distribution ratio was 10%, 15%, 20% or 25%, the BOD concentration of the treated water after the sedimentation step was 21 to 28 mg/L, the BOD removal ratio was 81 to 86%, and the SS concentration was 14 to 18 mg/L with an evaluation of "satisfactory."

Moreover, the raw water distribution ratio was set to 30%. Then, the amount of the raw water in the second step was 21.6 m³, and the BOD load in the second step was 0.6 kg/m³/d, which was beyond the limit of the treatment. When the raw water distribution ratio was 30% in RUN 6, the BOD concentration of the treated water after the sedimentation step was 32 mg/L, the removal ratio was 79%, and the SS concentration was 25 mg/L with an evaluation of "unsatisfactory."

Figure 6:
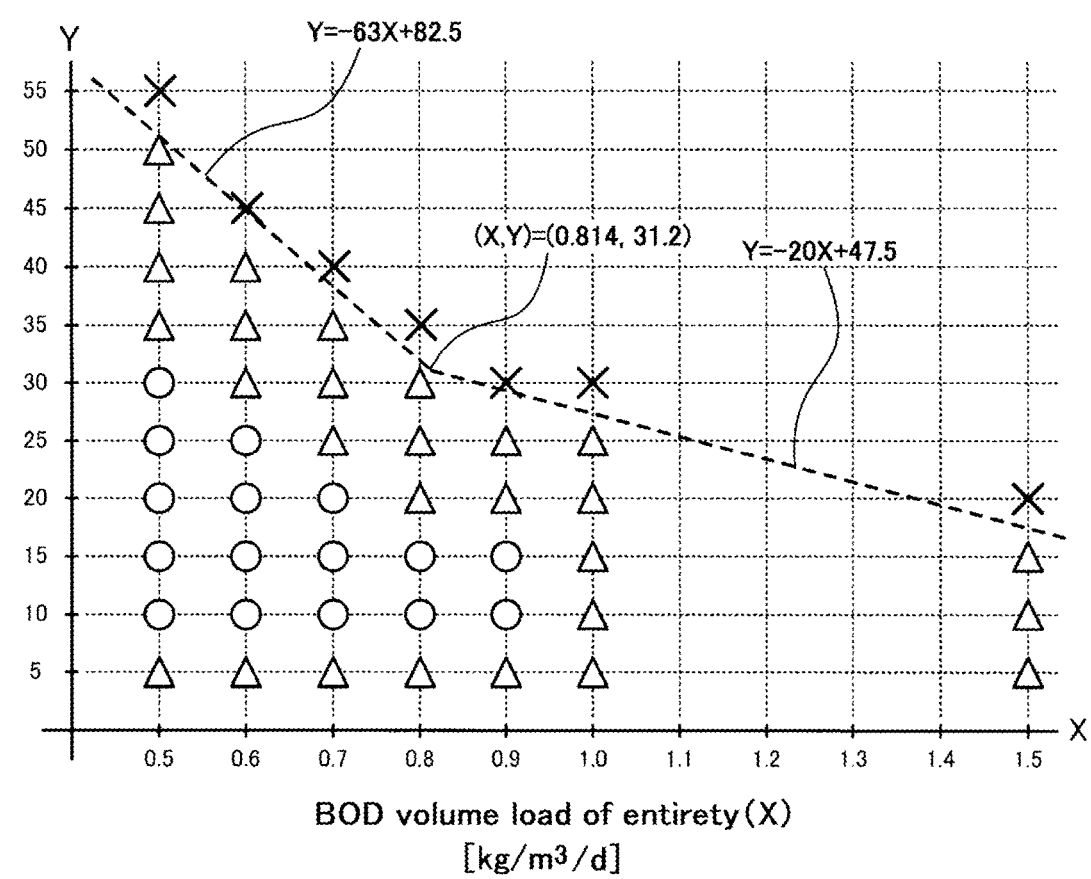
FIG. 6 is a graph showing the experiment results in Example 1.

The relationship between the BOD volume loads in Table 1 and the raw water distribution ratios is shown in the graph in FIG. 6. Here, the symbols "o," "Δ," and "×" in the graph reflect the evaluations in Table 1.

It can be understood from FIG. 6 that the water quality of the treated water can be set to "A (satisfactory)" or better by adjusting the system so that the ratio Y (%) of the supply amount of the organic wastewater to be supplied to the second biological treatment tank to the total supply amount of the organic wastewater satisfies the following Formula 1 with X being in a range from 0.5 or greater and less than 0.814, and satisfies the following Formula 2 with X being in a range from 0.814 or greater and 1.5 or less.

$$5 \leq Y < -63X + 82.5 \qquad \text{(Formula 1)}$$

$$5 \leq Y < -20X + 47.5 \qquad \text{(Formula 2)}$$

The two lines (dotted lines) on the upper side in FIG. 6 approximately indicate the border portion between the evaluations of "Δ" and "×" in order to specify the upper limit values of the ratio Y (%) of the supply amount of the organic wastewater to be supplied to the second biological treatment tank to the total supply amount of the organic wastewater.

The intersection of the two lines is at the coordinates of (X, Y)=(0.814, 31.2) as shown in FIG. 6.

It can also be understood from the results of Example 1 that it is preferable to set the BOD volume load in the second biological treatment tank that utilizes suspended microorganisms in a range from 0.05 kg/m³/d (the distribution ratio in the second step in RUN 1 is 5%) to 0.5 kg/m³/d (the distribution ratio in the second step in RUN 1 is 50% or the distribution ratio in RUN 6 is 25%) in order to maintain the water quality of the treated water at a level that can be evaluated as being "satisfactory" or higher from the point of view of the BOD concentration and the SS concentration. These numerical values correspond to the range that is 2 to 20 times greater as compared to the rough estimate of the sludge load "0.025 kg-BOD/kg-MLSS/d" that is disclosed in Patent Literature 2.

In order to improve the water quality of the treated water in the apparatus for biological treatment by using a fixed-type immobilized biocarrier according to the present invention, it can be understood that a high sludge load becomes necessary for the second biological treatment tank that uses suspended microorganisms.

EXAMPLE 2

In the present invention, the volume load can be made high in the first step, and the maximum volume load that makes the treatment therein possible is 3 kg/m³/d as in RUN 7 in Example 1. Meanwhile, the maximum treatment load is 0.5 kg/m³/d in the second step. When the system is viewed as a whole, it is technically reasonable to provide a significant load in the first step and provide a minimum load in the second step in such a range that the quality of the treated water can be permissible.

In Example 2, the raw water distribution ratio was examined in the case where the BOD concentration of the raw water was high in RUN 8. In addition, the change in the final treated water was examined in the case where the volume in the second step was increased relative to that in the first step in RUN 9. The MLSS concentration in the second step was 1000 mg/L.

Table 2 shows the results of RUN 8. The organic wastewater, which is the raw water in RUN 8, was 24 m³/d, and the BOD concentration thereof was 450 mg/L. In the case where the BOD concentration was high as well, it was examined whether or not the distribution ratio in the second step was reproduceable. The load in the entire system was 0.9 kg/m³/d, which was the same as the load in RUN 5 in Example 1.

When the volume in the first step was 6 m³ and the volume in the second step was 6 m³, the distribution ratio of the raw water was examined. The separation rate per area of water in the sedimentation step was 20 m³/m²/d, and solid-liquid separation was carried out in a gravitation-type sedimentation pond, and thus, the water quality of the treated water was evaluated.

As for the evaluation method of the results, the evaluation was made based on the level of achievement of the target value, which is concretely described as follows.

The generated SS concentration value that was estimated from the BOD conversion was 66% of the BOD. The BOD was 450 mg/L, and therefore, the generated SS concentration was 300 mg/L in this case.

1) In the case where the BOD removal ratio was 95% or greater and the SS was 30 mg/L or less, the evaluation was "very satisfactory," which is denoted by the symbol "○." In the case where the SS was 30 mg/L or less, the estimated removal ratio was 90% or higher 2) In the case where the BOD removal ratio was 80% or greater and less than 95% and the SS was 60 mg/L or less, the evaluation was "satisfactory," which is denoted by the symbol "Δ." In the case where the SS was 60 mg/L or less, the estimated removal ratio was 80% or higher.

3) In the case where the BOD removal ratio was less than 80% irrelevant of the SS concentration, the evaluation was "unsatisfactory," which is denoted by the symbol "," which is denoted by the symbol "x."

TABLE 2

Example 2

| Raw water distribution ratio (%) | | BOD volume load (kg/m3/d) | | | Treated water | | | |
| --- | --- | --- | --- | --- | --- | --- | --- | --- |
| Into first step | Into second step | Entire system | First step | Second step | BOD concentration (mg/L) | SS concentration (mg/L) | BOD removal ratio (%) | Evaluation (Note 2) |
| [RUN 8] Amount of raw water to be treated: 24 m3/d, BOD concentration of raw water: 450 mg/L Volume in first step: 6 m3, Volume in first step: 6 m3 | | | | | | | | |
| 100 | 0 | 0.9 | 1.80 | 0.00 | 60 | 50 | 87 | — |
| 95 | 5 | | 1.71 | 0.09 | 45 | 36 | 90 | Δ |
| 90 | 10 | | 1.62 | 0.18 | 23 | 30 | 95 | ○ |
| 85 | 15 | | 1.53 | 0.27 | 18 | 24 | 96 | ○ |
| 80 | 20 | | 1.44 | 0.36 | 68 | 45 | 85 | Δ |
| 75 | 25 | | 1.35 | 0.45 | 77 | 54 | 83 | Δ |
| 70 | 30 | | 1.26 | 0.54 | 99 | 66 | 78 | x |
| 65 | 35 | | 1.17 | 0.63 | 72 | 84 | 84 | x |
| [RUN 9] Amount of raw water to be treated: 24 m3/d, BOD concentration of raw water: 450 mg/L Volume in first step: 6 m3, Volume in first step: 12 m3 | | | | | | | | |
| 95 | 5 | 0.6 | 1.71 | 0.05 | 12 | 30 | 96 | ○ |
| 90 | 10 | | 1.62 | 0.09 | 18 | 24 | 96 | ○ |
| 85 | 15 | | 1.53 | 0.14 | 14 | 30 | 97 | ○ |
| 80 | 20 | | 1.44 | 0.18 | 9 | 24 | 98 | ○ |
| 75 | 25 | | 1.35 | 0.23 | 18 | 15 | 96 | ○ |
| 70 | 30 | | 1.26 | 0.27 | 18 | 24 | 96 | ○ |
| 65 | 35 | | 1.17 | 0.32 | 23 | 30 | 95 | ○ |

Note 1)
First step: This means the first treatment step (m3),
Note)
Second step: This means the second biological treatment step (m3).
Note 2)
Evaluation: The level of achievement of the target value is regarded as the evaluation, which is concretely described as follows.
○: "Very satisfactory" with the BOD removal ratio being 95% or greater and the SS being 30 mg/L or less.
Δ: "Satisfactory" with the BOD removal ratio being 80% or greater and less than 95% and the SS concentration being 60 mg/L or less.
x: "Unsatisfactory" with the BOD removal ration being less than 80% irrelevant of the SS concentration.

The BOD concentration in RUN 8 was three times higher than that in Example 1. In this state, the results of the treated water in RUN 8 were compared with those in RUN 5 in Example 1. The evaluation of the treatment for the distribution ratio of 5% to 25% was "satisfactory (Δ)" and "very satisfactory (○)," and thus, RUN 8 had the same evaluation as RUN 5 in Example 1. In RUN 8 as well, the evaluation of the water quality became "unsatisfactory" for the distribution ratio of 30% where the volume load in the second step exceeded 0.5 kg/m³/d.

It can be understood that even in the case where the BOD concentration of the raw water increased (fluctuated) as in RUN 8, the water quality of the treated water could be set to "satisfactory (Δ)" or better by adjusting the ratio of the supply amount of the organic wastewater to be supplied to the second biological treatment tank to the total supply amount of the organic wastewater to be in the numerical value range that is defined in Formula 1 or Formula 2 as described above.

In RUN 9, the distribution ratio of the raw water was examined when the volume in the first step was 6 m³ and the volume in the second step was 12 m³. The amount of the raw water and the concentration of the BOD prescription in the raw water were the same as in RUN 8. The separation rate per area of water in the prescription step was 20 m³/m²/d and solid-liquid separation was carried out in the gravitation-type prescription pond, and the water quality of the treated water was evaluated.

The volume in the second step increased to 12 m³, which made the load in the entire system be 0.6 kg/m³/d and the volume load in the second step be less than the limit value of 0.5 kg/m³/d. The BOD removal ratio of the treated water was 95% or higher, and the SS was 30 mg/L or less, and thus, the evaluation was in the range of "very satisfactory."

It can be seen from the above-described results that the BOD load in the entire system may be set irrelevant of the BOD of the raw water, and the distribution ratio of the raw water may be adjusted so that the volume load in the second step becomes the limit value of 0.5 kg/m³/d. It was determined that the application range shown in Example 1 was reproducible judging from the BOD concentration of the raw water, the volume load of the entire system, and the volume load in the second step, which is the limit value.

In the case where the volume in the second step can be made greater as compared to the volume in the first step as in RUN 9, it can be easily understood that the water quality of the treated water can be improved even by setting the ratio of the supply amount of the organic wastewater to be supplied to the second biological treatment tank to the total supply amount of the organic wastewater to be in a numerical value range which is so wide as to exceed the upper limit value that is defined in Formula 1 or Formula 2. However, there are many problems in terms of the space or the costs in simply increasing the volume in the second step, and therefore, it is preferable for the volume in the second step to have an upper limit that is two times greater than the volume in the first step as in RUN 9.

Conversely, a case where the volume in the second step was smaller than the volume in the first step is examined below. For example, a case where the volume in the first step was set to 9 m³ and the volume in the second step was set to 4.5 m³ in RUN 2 in Example 1 is examined. The BOD volume load of the entire system in this case was 0.8 kg/m³/d. In the case where the ratio of the supply amount of the organic wastewater discharged in the second step (raw water distribution ratio) was set to 5% and 10%, the BOD volume loads in the second step became 0.12 kg/m³/d and 0.24 kg/m³/d, respectively. When the BOD volume load in the second step in Example 1 was in a range from 0.1 to 0.3 kg/m³/d, the water quality of "very satisfactory" was gained, and therefore, in this case as well, the water quality of the treated water can be expected to be improved in the same manner.

In the case where the volume in the second step is smaller as compared to the volume in the first step, in general, it is necessary to further restrict the amount of the raw water to be distributed in the second step in order to make the BOD volume load in the second step be optimal. When the raw water distribution ratio in the second step is lower than 5%, however, it becomes difficult to maintain the BOD volume load in the second step in an optimal state due to the narrow width of adjustment of the distribution ratio of the raw water in the case where the amount of treatment of the raw water or the BOD concentration of the raw water changes.

Therefore, it is preferable for the ratio of the volume in the second step to the volume in the first step to be set to 0.5 or greater.

It can be seen from the above that it is preferable for the volume in the second step to be set in a range from 0.5 to 2 times greater than the volume in the first step. Here, in the present invention, the SS concentration easily becomes high in the first step though the treatment capacity of BOD is high. Thus, the role of lowering the SS concentration is expected in the second step. Therefore, it is necessary for the treatment rate in the second step to be maintained at a slower level than that in the first step, and it can be said that it is more preferable for the volume in the second step to be set in a range of one to two times greater than the volume in the first step.

EXAMPLE 3

The amount of organic wastewater, which is the raw water in RUN 11, was 72 m³/d. Treatment was carried out when the volume in the first step was set to 9 m³ and the volume in the second step was set to 9 m³ on the basis of the concentration of the organic wastewater and the load of the entire system of 0.6 kg/m³/d. The amount of returned sludge was varied for each RUN so that MLSS in the second step became 1000 mg/L. In the sedimentation step, the separation rate per area of water was 20 m³/m²/d, and solid-liquid separation was carried out in the gravitation-type sedimentation pond, and then the water quality of the treated water was evaluated. FIG. 5 shows the method that was implemented.

As for the method for evaluating the results, the level of achievement of the target value was regarded as the evaluation, which is concretely described as follows.

The generated SS concentration value that was estimated from the BOD conversion was 66% of the BOD. Since the BOD was 150 mg/L, the generated SS concentration in this case was 100 mg/L.

1) In the case where the BOD removal ratio was 95% or greater and the SS was 10 mg/L or less, the evaluation was "very satisfactory," which is denoted by the symbol "○." In the case where the SS was 10 mg/L or less, the estimated removal ratio was 90% or greater.

2) In the case where the BOD removal ratio was 80% or greater and less than 95% and the SS was 20 mg/L or less, the evaluation was "satisfactory," which is denoted by the symbol "Δ." In the case where the SS was 20 mg/L or less, the estimated removal ratio was 80% or greater.

3) In the case where the BOD removal ratio was less than 80% irrelevant of the SS concentration, the evaluation was "unsatisfactory," which is denoted by the symbol "×".

Concretely, detectors with which the organic concentration can be measured were provided along the raw water line and in the water quality measuring unit where the stream within the second step that had outflowed in the first step and the raw water fed into the second step merged, and two signals from these (soluble BOD values) were introduced into the computing mechanism, the flow amount adjusting mechanism was adjusted so that the soluble BOD value in the water quality measuring unit in the second step became a predetermined ratio of the soluble BOD value of the raw water, and thus, the amount of the raw water to flow into the second step was adjusted. By doing so, the flow amount in the first step was consequently changed. Here, the soluble BOD value means the BOD concentration from which the SS was excluded. In the second step, the MLSS was 1000 mg/L, and therefore, an error was large in the BOD measurement, and thus, the value of the soluble BOD from which the MLSS was filtered out was used as an indicator for the control.

In RUN 11, the BOD concentration of the raw water was 150 mg/L, and the system was designed with the BOD load of the entire system being 0.6 kg/m$^3$/d. The volume in the first step was 9 m$^3$, and the volume in the second step was 9 m$^3$. Table 3 shows the results in RUN 11. In RUN 11, a water immersion-type water quality measuring spectrum analyzer BOD gauge (Type Sp1-005-p0-sNO-075 made by Ebara Jitsugyo Co., Ltd.) was used for the measurements of the BOD concentration and the S-BOD value.

and thus, the removal ratio could be maintained at 98%. The SS concentration was 5 mg/L. It can be seen from the BOD removal ratio and the SS concentration that the results of the treatment in Tests 13 and 14 were evaluated as "very satisfactory."

In Test 15, the raw water distribution amount was adjusted and increased to 18 m$^3$/d, and then, the S-BOD value and the ratio thereof to the BOD concentration of the raw water became 38 mg/L and 25.3%. In this state, the BOD concentration of the treated water after the sedimentation step was 9 mg/L with the removal ratio of 94%, which was lower as compared to Test 14. The SS concentration was 15 mg/L.

TABLE 3

Example 3: RUN11
Amount of raw water to be treated: 72 m3/d,
BOD concentration of raw water: 150 mg/L, BOD load of entire system: 0.6 kg/m3/d

| | Second step | | Results of treatment and evaluation | | | | Amount of inflow into second step |
|---|---|---|---|---|---|---|---|
| Test NO. | S-BOD (mg/L) (Note 1) | Ratio to concentration of raw water (%) | BOD concentration (mg/L) | BOD removal ratio (%) | SS concentration (mg/L) | Evaluation of treatment (Note 2) | Raw water distribution amount (m3/d) |
| 11 | 10 | 6.7 | 15 | 90 | 10 | Δ | 5 |
| 12 | 15 | 10.0 | 3 | 98 | 8 | ○ | 7 |
| 13 | 23 | 15.3 | 3 | 98 | 5 | ○ | 11 |
| 14 | 30 | 20.0 | 3 | 98 | 5 | ○ | 14 |
| 15 | 38 | 25.3 | 9 | 94 | 15 | Δ | 18 |
| 16 | 40 | 26.7 | 15 | 90 | 18 | Δ | 19 |
| 17 | 45 | 30.0 | 21 | 86 | 20 | Δ | 22 |
| 18 | 50 | 33.3 | 33 | 78 | 25 | x | 24 |

Note 1)
S-BOD: This means "soluble BOD".
Note 2)
Evaluation: The level of achievement of the target value is regarded as the evaluation, which is concretely described as follows.
○: "Very satisfactory" with the BOD removal ratio being 95% or greater and the SS being 10 mg/L or less.
Δ: "Satisfactory" with the BOD removal ratio being 80% or greater and less than 95% and the SS concentration being 20 mg/L or less.
x: "Unsatisfactory" with the BOD removal ratio being less than 80% irrelevant of the SS concentration.

In Table 3, the soluble BOD value in the water quality measuring unit in the second step is denoted as "S-BOD value."

In Test 11, the amount of the raw water distributed into the second step was 5 m$^3$ and the S-BOD value was 10 mg/L, which was 6.7% of the BOD concentration of the raw water. The BOD concentration of the treated water after the sedimentation step in Test 11 was 15 mg/L, the removal ratio was 90%, and the SS concentration was 10 mg/L with an evaluation of "satisfactory (Δ)."

In Test 12, the amount of the raw water distributed into the second step was increased to 7 m$^3$/d by adjusting the flow amount adjusting mechanism so that the S-BOD value became 15 mg/L, which was 10% of the BOD concentration of the raw water. In Test 12, the BOD concentration of the treated water after the sedimentation step was 3 mg/L, the removal ratio was greatly increased to 98%, and the SS concentration was 8 mg/L. On the basis of the BOD removal ratio and the SS concentration, the results of the treatment in Test 12 were evaluated as "very satisfactory (○)."

In Test 13, the raw water distribution amount was increased to 11 m$^3$/d, and in Test 14, the raw water distribution amount was increased to 14 m$^3$/d. Then, the S-BOD value and the ratio thereof to the BOD concentration of the raw water were 23 mg/L and 15.3% in Test 13 and 30 mg/L and 20% in Test 14. In these states, the BOD concentration of the treated water after the sedimentation step was 3 mg/L, Judging from the BOD removal ratio and the SS concentration, the results of the treatment in Test 15 were evaluated as "satisfactory."

It could be determined from the results in Tests 12 to 14 that an appropriate range of the S-BOD value relative to the BOD concentration of the raw water that made the results of treatment be "very satisfactory" was from 10% to 20%.

The raw water distribution amount was adjusted and increased to 19 m$^3$/d in Test 16 and to 22 m$^3$/d in Test 17. The S-BOD value and the ratio thereof to the BOD concentration of the raw water were 40 mg/L and 26.7% in Test 16 and 45 mg/L and 30% in Test 17, and thus, the ratios of the S-BOD value to the BOD value of the raw water were higher than the set value in a range from 10% to 20%.

In the treated water after the sedimentation step, the BOD concentration was 15 mg/L, the removal ratio was 90%, and the SS concentration was 18 mg/L in Test 16. The BOD concentration was 21 mg/L, the removal ratio was 86%, and the SS concentration was 20 mg/L in Test 17.

Judging from the BOD removal ratio and the SS concentration, the results of the treatment in Test 16 and Test 17 were evaluated as "satisfactory."

The raw water distribution amount was adjusted to 24 m$^3$/d in Test 18. In this case, the S-BOD value was 50 mg/L, and the ratio thereof to the BOD concentration of the raw water was 33.3%. In Test 18, the BOD concentration of the treated water after the sedimentation step was 33 mg/L, the removal ratio was 78%, and the SS concentration was 25 mg/L. Judging from the BOD removal ratio and the SS concentration, the results of the treatment in Test 18 were evaluated as "unsatisfactory (×)."

After the completion of Test 18, the computing mechanism was operated so as to adjust the flow amount adjusting mechanism in order to make the S-BOD value be 23 mg/L and the ratio thereof to the BOD concentration of the raw water be 15.3% in the water quality measuring unit in the second step, and thus, the raw water distribution amount was lowered. And then, the BOD concentration of the treated water after the sedimentation step was 3 mg/L, and the removal ratio was greatly increased to 98%. At this time, the raw water distribution amount was 11 m³/d.

It can be seen from the above-described results that a state that can be evaluated as "satisfactory (Δ)" or better is achieved when the flow amount adjusting mechanism is adjusted so that the ratio of the S-BOD value in the second step to the BOD concentration of the raw water is in a range from 6.7% to 30%.

Furthermore, a state that can be evaluated as "very satisfactory (○)" is achieved when the flow amount adjusting mechanism is adjusted so that the ratio of the S-BOD value in the second step to the BOD concentration of the raw water is in a range from 10% to 20%.

It is clarified from the above that the control of the water quality in the present system is possible by setting the ratio of the S-BOD value in the second step to the BOD concentration of the raw water.

It can be seen from the above-described tests that the present system can be easily maintained in an optimal operation state by setting the ratio of the S-BOD value to the BOD concentration of the raw water to a value in a range from 6.7% to 30%, preferably from 10% to 20%, and by operating the computing mechanism with this value so that the flow amount adjusting mechanism can be adjusted and the flow amount of the raw water in the second step can be adjusted.

EXAMPLE 4

In RUN 12, the BOD concentration of the raw water was 300 mg/L, and the system was designed with the BOD load of the entire system being 0.6 kg/m³/d. The volume in the first step was 18 m³, the volume in the second step was 18 m³, and the MLSS in the second step was 1000 mg/L.

In RUN 12, the BOD concentration and the S-BOD value were measured by using a water immersion-type water quality measuring spectrum analyzer BOD gauge (Type Sp1-005-p0-sNO-075 made by Ebara Jitsugyo Co., Ltd.).

Table 4 shows the results. Here, the soluble BOD value in the water quality measuring unit in the second step is denoted as "S-BOD value."

As for the method for evaluating the results, the level of achievement of the target value was regarded as the evaluation, which is concretely described as follows.

The generated SS concentration value that was estimated from the BOD conversion was 66% of the BOD. Since the BOD was 300 mg/L, the generated SS concentration in this case was 200 mg/L.

1) In the case where the BOD removal ratio was 95% or greater and the SS was 20 mg/L or less, the evaluation was "very satisfactory," which is denoted by the symbol "○." In the case where the SS was 20 mg/L or less, the estimated removal ratio was 90% or greater.

2) In the case where the BOD removal ratio was 80% or greater and less than 95% and the SS was 40 mg/L or less, the evaluation was "satisfactory," which is denoted by the symbol "Δ." In the case where the SS was 40 mg/L or less, the estimated removal ratio was 80% or greater.

3) In the case where the BOD removal ratio was less than 80% irrelevant of the SS concentration, the evaluation was "unsatisfactory," which is denoted by the symbol "×."

TABLE 4

Example 4: RUN 12
Amount of raw water to be treated: 72 m3/d,
BOD concentration of raw water: 300 mg/L, BOD load of entire system: 0.6 kg/m3/d

| | Second step | | Results of treatment and evaluation | | | | Amount of inflow into second step |
|---|---|---|---|---|---|---|---|
| Test NO. | S-BOD (mg/L) (Note 1) | Ratio to concentration of raw water (%) | BOD concentration (mg/L) | BOD removal ratio (%) | SS concentration (mg/L) | Evaluation of treatment (Note 2) | Raw water distribution amount (m3/d) |
| 21 | 20 | 6.7 | 30 | 90 | 20 | Δ | 5 |
| 22 | 30 | 10.0 | 9 | 97 | 16 | ○ | 7 |
| 23 | 45 | 15.0 | 9 | 97 | 10 | ○ | 11 |
| 24 | 60 | 20.0 | 9 | 97 | 10 | ○ | 14 |
| 25 | 75 | 25.0 | 30 | 90 | 20 | Δ | 18 |
| 26 | 80 | 26.7 | 36 | 88 | 30 | Δ | 19 |
| 27 | 90 | 30.0 | 58 | 81 | 30 | Δ | 22 |
| 28 | 100 | 33.3 | 64 | 78 | 45 | × | 24 |

Note 1)
S-BOD: This means "soluble BOD".

Note 2)
Evaluation: The level of achievement of the target value is regarded as the evaluation, which is concretely described as follows.
○: "Very satisfactory" with the BOD removal ratio being 95% or greater and the SS being 20 mg/L or less.
Δ: "Satisfactory" with the BOD removal ratio being 80% or greater and less than 95% and the SS concentration being 40 mg/L or less.
×: "Unsatisfactory" with the BOD removal ratio being less than 80% irrelevant of the SS concentration.

In RUN 12, the BOD concentration of the raw water was as high as 300 mg/L, and therefore, the method shown in FIG. 4 was implemented. Water was not collected from the water quality measuring portion, but from the point where the stream flowing out from the first step into the second step and the raw water flowing into the second step merged so as to be immediately analyzed in accordance with the adopted method.

In Test 21, the amount of the raw water distributed into the second step was 5 m³ and the S-BOD value was 20 mg/L, which was 6.7% relative to the BOD concentration of the raw water. The BOD concentration of the treated water after the sedimentation step was 30 mg/L, the removal ratio was 90%, and the SS concentration was 20 mg/L, and thus, the treated water was evaluated as "satisfactory (Δ)."

In Test 22, the amount of the raw water distributed into the second step was increased to 7 m³/d and the S-BOD value was 30 mg/L, which was 10% relative to the BOD concentration of the raw water. In Test 22, the BOD concentration of the treated water after the sedimentation step was 9 mg/L, the removal ratio was 97%, and the SS concentration was 16 mg/L, and thus, the evaluation of this treated water was "very satisfactory (o)" with the water quality being greatly improved.

The raw water distribution amount was adjusted and set to 11 m³/d in Test 23 and 14 m³/d in Test 24, and then, the S-BOD value and the ratio thereof to the BOD value of the raw water became 45 mg/L and 15.0% in Test 23 and 60 mg/L and 20% in Test 24. In these states as well, the evaluation of the treated water could be maintained as "very satisfactory" with the BOD concentration of the treated water after the sedimentation step being 9 mg/L, the removal ratio being 97%, and the SS concentration being 10 mg/L.

In Test 25, the raw water distribution amount was increased to 18 m³/d by adjusting the flow amount adjusting mechanism, and then, the S-BOD value and the ratio thereof to the BOD value of the raw water became 75 mg/L and 25.0%. In this state, the BOD concentration of the treated water after the sedimentation step was 30 mg/L, the removal ratio was 90%, and the SS concentration was 20 mg/L, and thus, the treated water was evaluated as "satisfactory."

In Tests 26 and 27, the flow amount adjusting mechanism was adjusted, and the raw water distribution amount was 19 m³/d in Test 26 and 22 m³/d in Test 27. The S-BOD value and the ratio thereof to the BOD concentration of the raw water were 80 mg/L and 26.7% in Test 26 and 90 mg/L and 30% in Test 27, and thus, the ratios of the S-BOD value to the BOD concentration of the raw water were higher than the set value in a range from 10% to 20%. In this state, the BOD concentration was 36 mg/L, the removal ratio was 88%, and the SS concentration was 30 mg/L in the treated water after the sedimentation step in Test 26. The BOD concentration was 58 mg/L, the removal ratio was 81%, and the SS concentration was 30 mg/L in Test 27, and thus, the evaluation of the treated water was "satisfactory."

In Test 28, the flow amount adjusting mechanism was adjusted so that the raw water distribution amount became 24 m³/d. The S-BOD value and the ratio thereof to the BOD concentration of the raw water were 100 mg/L and 33.3%, and thus, the ratio of the S-BOD value to the BOD concentration of the raw water was higher than the set value in a range from 10% to 20%. In this state, the BOD concentration was 64 mg/L, the removal ratio was 78%, and the SS concentration was 45 mg/L in the treated water after the sedimentation step, and thus, the evaluation of the treated water was "unsatisfactory (×)."

It can be seen from the results of Tests 21 through 28 that the ratio of the S-BOD value in the second step to the BOD concentration of the raw water was in a range from 6.7% to 30%, the BOD removal ratio was 90% or greater and the SS was 40 mg/L or less, which was 20% or less of the generated SS concentration value that was estimated from the BOD conversion, and thus, a state that was evaluated as "satisfactory" or better was achieved.

Furthermore, as can be seen from the results of Tests 22 through 24, the ratio of the S-BOD value in the second step to the BOD concentration of the raw water was in a range from 10% to 20%, the BOD removal ratio was 95% or greater and the SS was 20 mg/L or less, which was 10% or less of the generated SS concentration value that was estimated from the BOD conversion, and thus, a state that was evaluated as "very satisfactory" was achieved.

After the completion of Test 28, the raw water distribution amount was lowered by operating the computing mechanism so as to adjust the flow amount adjusting mechanism in order for the S-BOD value in the water quality measuring unit in the second step to be 45 mg/L, that is to say, in order for the ratio thereof to the BOD concentration of the raw water to be 15%, and then, the BOD concentration of the treated water after the sedimentation step was 9 mg/L and the removal ratio could be greatly increased to 97%. At this time, the raw water distribution amount was 11 m³/d. In addition, the S-BOD value was controlled to be 30 through 60 mg/L so that the ratio to the BOD concentration of the raw water became 10% to 20%, and then, the BOD concentration of the treated water after the sedimentation step was 9 mg/L and the removal ratio was greatly increased to 97% in a state of "very satisfactory," and thus, the results of the control could be verified.

It can be seen from the above results that the flow amount adjusting mechanism could be adjusted so that the ratio of the S-BOD value in the second step to the BOD concentration of the raw water was in a range from 6.7% to 30% in the case where the BOD concentration of the raw water was made higher than that in Example 3 (here, the BOD load of the entire system was the same as in Example 3), and thus, a state that was evaluated as "satisfactory (Δ)" or better could be achieved.

Furthermore, the flow amount adjusting mechanism could be adjusted so that the ratio of the S-BOD value in the second step to the BOD concentration of the raw water was in a range from 10% to 20%, and then, a state that was evaluated as "very satisfactory (o)" could be achieved.

It was clarified from the above that the control of the water quality in the present system was possible by setting the S-BOD value in the second step, that is to say, by setting the ratio thereof to the BOD concentration of the raw water, even when the BOD concentration of the raw water changed.

It can be seen from the above tests that the present system could be easily maintained in an optimal operation state by adjusting the ratio of the S-BOD value in the second step to the BOD concentration of the raw water to 6.7 to 30%, preferably to 10% to 20%, and by operating the computing mechanism with this value so as to adjust the flow amount adjusting mechanism for the adjustment of the amount of the raw water that flows into the second step.

EXAMPLE 5

RUN 13 was carried out as Example 5. The amount of the organic wastewater, which was the raw water in RUN 13, was 72 m³/d. In RUN 13, the system was designed with the BOD concentration of the raw water being 150 mg/L and the BOD load of the entire system being 0.9 kg/m³/d.

The volume in the first step was 6 m³ and the volume in the second step was 6 m³. Table 5 shows the results. Here, the soluble BOD value in the water quality measuring unit 5 in the second step was denoted as "S-BOD value."

FIG. 5 shows the method that was implemented.

In RUN 13, the BOD concentration and the S-BOD value were measured by using a water immersion-type water quality measuring spectrum analyzer BOD gauge (Type Sp1-005-p0-sNO-075 made by Ebara Jitsugyo Co., Ltd.).

As for the method for evaluating the results, the level of the achievement of the target value was evaluated, which is concretely described below.

The generated SS concentration value that was estimated from the BOD conversion was 66% of the BOD. The BOD was 150 mg/L, and therefore, the generated SS concentration was 100 mg/L in this case.

1) In the case where the BOD removal ratio was 95% or greater and the SS was 20 mg/L or less, the evaluation was "very satisfactory," which is denoted by the symbol "○." In the case where the SS was 10 mg/L or less, the estimated removal ratio was 90% or greater.

2) In the case where the BOD removal ratio was 80% or greater and less than 95% and the SS was 40 mg/L or less, the evaluation was "satisfactory," which is denoted by the symbol "Δ." In the case where the SS was 20 mg/L or less, the estimated removal ratio was 80% or greater.

3) In the case where the BOD removal ratio was less than 80% irrelevant of the SS concentration, the evaluation was "unsatisfactory," which is denoted by the symbol "×".

was 6.7%. The BOD concentration of the treated water after the sedimentation step was 15 mg/L, the removal ratio was 90%, and the SS concentration was 12 mg/L with an evaluation of the treated water being "satisfactory (Δ)."

In Test 32, the raw water distribution amount in the second step was increased to 7 m³/d. Then, the S-BOD value was 15 mg/L, and the ratio thereof to the BOD concentration of the raw water was 10%. In Test 32, the BOD concentration of the treated water after the sedimentation step was 4.5 mg/L, the removal ratio was 97% and the SS concentration was 10 mg/L with an evaluation of the treated water being "very satisfactory (a)," and thus, the water quality was greatly improved.

The raw water distribution amount was adjusted and set to 11 m³/d in Test 33 and 14 m³/d in Test 34, and then, the S-BOD value and the ratio thereof to the BOD of the raw water were 23 mg/L and 15.0% in Test 33 and 30 mg/L and 20% in Test 34. In these states as well, the BOD concentration of the treated water after the sedimentation step was 4.5 mg/L, the removal ratio was 97%, and the SS concentration was 7 mg/L, and thus, a state with an evaluation of the treated water being "very satisfactory" could be maintained.

In Test 35, the raw water distribution amount was increased to 18 m³/d by adjusting the flow amount adjusting mechanism, and then, the S-BOD value and the ratio thereof to the BOD of the raw water were 38 mg/L and 25.0%. In this state, the BOD concentration of the treated water after the sedimentation step was 15 mg/L, the removal ratio was 90%, and the SS concentration was 12 mg/L with an evaluation of the treated water being "satisfactory."

TABLE 5

RUN 13
Amount of raw water to be treated: 72 m3/d,
BOD concentration of raw water: 150 mg/L, BOD load of entire system: 0.9 kg/m3/d

| | Second step | | Results of treatment and evaluation | | | | Amount of inflow into second step |
|---|---|---|---|---|---|---|---|
| Test NO. | S-BOD (mg/L) (Note 1) | Ratio to concentration of raw water (%) | BOD concentration (mg/L) | BOD removal ratio (%) | SS concentration (mg/L) | Evaluation of treatment (Note 2) | Raw water distribution amount (m3/d) |
| 31 | 10 | 6.7 | 15 | 90 | 12 | Δ | 5 |
| 32 | 15 | 10.0 | 4.5 | 97 | 10 | ○ | 7 |
| 33 | 23 | 15.0 | 4.5 | 97 | 7 | ○ | 11 |
| 34 | 30 | 20.0 | 4.5 | 97 | 7 | ○ | 14 |
| 35 | 38 | 25.0 | 15 | 90 | 12 | Δ | 18 |
| 36 | 40 | 26.7 | 18 | 88 | 17 | Δ | 19 |
| 37 | 45 | 30.0 | 27 | 82 | 20 | Δ | 22 |
| 38 | 50 | 33.3 | 38 | 75 | 28 | x | 24 |

Note 1)
S-BOD: This means "soluble BOD".
Note 2)
Evaluation: The level of achievement of the target value is regarded as the evaluation, which is concretely described as follows.
○: "Very satisfactory" with the BOD removal ratio being 95% or greater and the SS being 10 mg/L or less.
Δ: "Satisfactory" with the BOD removal ratio being 80% or greater and less than 95% and the SS concentration being 40 mg/L or less.
x: "Unsatisfactory" with the BOD removal ratio being less than 80% irrelevant of the SS concentration.

In RUN 13, the BOD concentration of the raw water was 150 mg/L, and the method shown in FIG. 4 was implemented. Water was not collected from the water quality measuring portion, but from the point where the stream flowing out from the first step into the second step and the raw water flowing into the second step merged so as to be immediately analyzed in accordance with the adopted method.

In Test 31, the raw water distribution amount in the second step was 5 m³, the S-BOD value was 10 mg/L, and the ratio thereof to the BOD concentration of the raw water The flow amount adjusting mechanism was adjusted in Test 36 and Test 37 so that the raw water distribution amount became 19 m³/d in Test 36 and 22 m³/d in Test 37. The S-BOD value and the ratio thereof to the BOD concentration of the raw water were 40 mg/L and 26.7% in Test 36 and 45 mg/L and 30% in Test 37, which was higher than the set value of the ratio to the BOD concentration of the raw water of 10% to 20%. In this state, the BOD concentration of the treated water after the sedimentation step was 18 mg/L, the removal ratio was 88%, and the SS concentration was 17 mg/L in Test 36. The BOD concentration was 27 mg/L, the removal ratio was 82%, and the SS concentration was 20 mg/L in Test 37, and thus, the evaluation of the treated water was "satisfactory."

In Test 38, the flow amount adjusting mechanism was adjusted so that the raw water distribution amount became 24 m³/d. The S-BOD value and the ratio thereof to the BOD concentration of the raw water were 50 mg/L and 33.3%, which was higher than the set value of the ratio to the BOD concentration of the raw water of 10% to 20%. In this state, the BOD concentration of the treated water after the sedimentation step was 38 mg/L, the removal ratio was 75%, and the SS concentration was 28 mg/L with an evaluation of the treated water being "unsatisfactory (×)."

It can be seen from the results in Tests 31 through 38 that the generated SS concentration value that was estimated from the BOD conversion was 20% or less, and thus, a state with an evaluation of "satisfactory" or better was achieved when the ratio of the S-BOD value in the second step to the BOD concentration of the raw water was in a range from 6.7% to 30.0%, the BOD removal ratio was 90% or greater, and the SS was 20 mg/L or less.

Furthermore, it can be seen from the results in Tests 32 through 34 that the generated SS concentration value that was estimated from the BOD conversion was 10% or less, and thus, a state with an evaluation of "very satisfactory" was achieved when the ratio of the S-BOD value in the second step to the BOD concentration of the raw water was in a range from 10% to 20%, the BOD removal ratio was 95% or greater, and the SS was 10 mg/L or less.

After the completion of Test 38, the raw water distribution amount was lowered by operating the computing mechanism so as to adjust the flow amount adjusting mechanism in order for the S-BOD value in the water quality measuring unit in the second step to be 23 mg/L, that is to say, in order for the ratio thereof to the BOD concentration of the raw water to be 15%, and then, the BOD concentration of the treated water after the sedimentation step was 4.5 mg/L, the removal ratio could be greatly increased to 97%, and the SS concentration was 7 mg/L. At this time, the raw water distribution amount was 11 m³/d. In addition, the S-BOD value was controlled so as to be 15 through 30 mg/L so that the ratio to the BOD concentration of the raw water became 10% to 20%, and then, the BOD concentration of the treated water after the sedimentation step was 4.5 mg/L, the removal ratio could be greatly increased to 97%, and the SS concentration was 7 mg/L to 10 mg/L, and thus, a state of "very satisfactory" could be maintained and the effects of the control could be verified.

As can be seen from the above results, the flow amount adjusting mechanism could be adjusted so that the ratio of the S-BOD value in the second step to the BOD concentration of the raw water was in a range from 6.7% to 30%, and then, a state with an evaluation of "satisfactory (Δ)" or better could be achieved even in the case where the BOD load of the entire system had increased (varied).

Furthermore, the flow amount adjusting mechanism could be adjusted so that the ratio of the S-BOD value in the second step to the BOD concentration of the raw water was in a range from 10% to 20%, and then, a state with an evaluation of "very satisfactory (○)" could be achieved.

It was clarified from the above that the control of the water quality in the present system was possible by setting the S-BOD value in the second step to a predetermined ratio relative to the BOD concentration of the raw water even when the BOD load of the entire system fluctuated.

As can be seen from the above tests, the present system can be easily maintained in an optimal operation state by setting the ratio of the S-BOD value in the second step to the BOD concentration of the raw water to 6.7 to 30%, preferably 10% to 20%, and by operating the computing mechanism with this value so as to adjust the flow amount adjusting mechanism for the adjustment of the amount of raw water flowing into the second step.

EXAMPLE 6

RUN 14 was carried out as Example 6. The amount of the organic wastewater, which was the raw water in RUN 14, was 72 m³/d. In RUN 14, the system was designed with the BOD concentration of the raw water being 300 mg/L and the BOD load of the entire system being 0.9 kg/m³/d.

The volume in the first step was 12 m³ and the volume in the second step was 12 m³. Table 6 shows the results. Here, the soluble BOD value in the water quality measuring unit in the second step was denoted as "S-BOD value."

In RUN 14, the BOD concentration and the S-BOD value were measured by using a water immersion-type water quality measuring spectrum analyzer BOD gauge (Type Sp1-005-p0-sNO-075 made by Ebara Jitsugyo Co., Ltd.).

As for the method for evaluating the results, the level of the achievement of the target value was evaluated, which is concretely described below. The generated SS concentration value that was estimated from the BOD conversion was 66% of the BOD. The BOD was 300 mg/L, and therefore, the generated SS concentration was 200 mg/L in this case.

1) In the case where the BOD removal ratio was 95% or greater and the SS was 20 mg/L or less, the evaluation was "very satisfactory," which is denoted by the symbol "○." In the case where the SS was 20 mg/L or less, the estimated removal ratio was 90% or greater.

2) In the case where the BOD removal ratio was 80% or greater and less than 95% and the SS was 40 mg/L or less, the evaluation was "satisfactory," which is denoted by the symbol "Δ." In the case where the SS was 40 mg/L or less, the estimated removal ratio was 80% or greater.

3) In the case where the BOD removal ratio was less than 80% irrelevant of the SS concentration, the evaluation was "unsatisfactory," which is denoted by the symbol "×".

TABLE 6

RUN 14
Amount of raw water to be treated: 72 m3/d,
BOD concentration of raw water: 300 mg/L, BOD load of entire system: 0.9 kg/m3/d

| | Second step | | Results of treatment and evaluation | | | | Amount of inflow into second step |
|---|---|---|---|---|---|---|---|
| Test NO. | S-BOD (mg/L) (Note 1) | Ratio to concentration of raw water (%) | BOD concentration (mg/L) | BOD removal ratio (%) | SS concentration (mg/L) | Evaluation of treatment (Note 2) | Raw water distribution amount (m3/d) |
| 41 | 20 | 6.7 | 30 | 90 | 17 | Δ | 5 |
| 42 | 30 | 10.0 | 9 | 97 | 14 | ○ | 7 |
| 43 | 45 | 15.0 | 9 | 97 | 10 | ○ | 11 |
| 44 | 60 | 20.0 | 9 | 97 | 10 | ○ | 14 |
| 45 | 75 | 25.0 | 30 | 90 | 25 | Δ | 18 |
| 46 | 80 | 26.7 | 36 | 88 | 32 | Δ | 19 |
| 47 | 90 | 30.0 | 54 | 82 | 35 | Δ | 22 |
| 48 | 100 | 33.3 | 81 | 73 | 40 | Δ | 24 |

Note 1)
S-BOD: This means "soluble BOD".
Note 2)
Evaluation: The level of achievement of the target value is regarded as the evaluation, which is concretely described as follows.
○: "Very satisfactory" with the BOD removal ratio being 95% or greater and the SS being 20 mg/L or less.
Δ: "Satisfactory" with the BOD removal ratio being 80% or greater and less than 95% and the SS concentration being 40 mg/L or less.
x: "Unsatisfactory" with the BOD removal ration being less than 80% irrelevant of the SS concentration.

In RUN 14, the BOD concentration of the raw water was 300 mg/L, and the method shown in FIG. 4 was implemented. Water was not collected from the water quality measuring portion, but from the point where the stream flowing out from the first step into the second step and the raw water flowing into the second step merged so as to be immediately analyzed with a water immersion-type water quality measuring spectrum analyzer BOD gauge (Type Sp1-005-p0-sNO-075 made by Ebara Jitsugyo Co., Ltd.) in accordance with the adopted method.

In Test 41, the raw water distribution amount in the second step was 5 m³, the S-BOD value was 20 mg/L, and the ratio thereof to the BOD concentration of the raw water was 6.7%. The BOD concentration of the treated water after the sedimentation step was 30 mg/L, the removal ratio was 90%, and the SS concentration was 17 mg/L with an evaluation of the treated water being "satisfactory (Δ)."

In Test 42, the raw water distribution amount in the second step was increased to 7 m³/d. Then, the S-BOD value was 30 mg/L, and the ratio thereof to the BOD concentration of the raw water was 10%. In Test 42, the BOD concentration of the treated water after the sedimentation step was 9 mg/L, the removal ratio was 97% and the SS concentration was 14 mg/L with an evaluation of the treated water being "very satisfactory (○)," and thus, the water quality was greatly improved.

The raw water distribution amount was adjusted and set to 11 m³/d in Test 43 and 14 m³/d in Test 44, and then, the S-BOD value and the ratio thereof to the BOD of the raw water were 45 mg/L and 15.0% in Test 43 and 60 mg/L and 20% in Test 44. In these states as well, the BOD concentration of the treated water after the sedimentation step was 9 mg/L, the removal ratio was 97%, and the SS concentration was 10 mg/L, and thus, a state with an evaluation of the treated water being "very satisfactory" could be maintained.

In Test 45, the raw water distribution amount was increased to 18 m³/d by adjusting the flow amount adjusting mechanism, and then, the S-BOD value and the ratio thereof to the BOD of the raw water were 75 mg/L and 25.0%. In this state, the BOD concentration of the treated water after the sedimentation step was 30 mg/L, the removal ratio was 90%, and the SS concentration was 25 mg/L with an evaluation of the treated water being "satisfactory."

The flow amount adjusting mechanism was adjusted in Test 46 and Test 47 so that the raw water distribution amount became 19 m³/d in Test 46 and 22 m³/d in Test 47. The S-BOD value and the ratio thereof to the BOD concentration of the raw water were 80 mg/L and 26.7% in Test 46 and 90 mg/L and 30% in Test 47, which was higher than the set value of the ratio to the BOD concentration of the raw water of 10% to 20%. In this state, the BOD concentration of the treated water after the sedimentation step was 36 mg/L, the removal ratio was 88%, and the SS concentration was 32 mg/L in Test 46. The BOD concentration was 54 mg/L, the removal ratio was 82%, and the SS concentration was 35 mg/L in Test 47, and thus, the evaluation of the treated water was "satisfactory."

In Test 48, the flow amount adjusting mechanism was adjusted so that the raw water distribution amount became 24 m³/d. The S-BOD value and the ratio thereof to the BOD concentration of the raw water were 100 mg/L and 33.3%, which was higher than the set value of the ratio to the BOD concentration of the raw water of 10% to 20%. In this state, the BOD concentration of the treated water after the sedimentation step was 81 mg/L, the removal ratio was 73%, and the SS concentration was 40 mg/L with an evaluation of the treated water being "unsatisfactory (x)."

It can be seen from the results in Tests 41 through 48 that the generated SS concentration value that was estimated from the BOD conversion was 20% or less, and thus, a state with an evaluation of "satisfactory" or better was achieved when the ratio of the S-BOD value in the second step to the BOD concentration of the raw water was in a range from 6.7% to 30%, the BOD removal ratio was 90% or greater, and the SS was 40 mg/L or less.

Furthermore, it can be seen from the results in Tests 42 through 44 that the generated SS concentration value that was estimated from the BOD conversion was 10% or less, and thus, a state with an evaluation of "very satisfactory" was achieved when the ratio of the S-BOD value in the second step to the BOD concentration of the raw water was in a range from 10% to 20%, the BOD removal ratio was 95% or greater, and the SS was 20 mg/L or less.

After the completion of Test 48, the raw water distribution amount was lowered by operating the computing mechanism so as to adjust the flow amount adjusting mechanism in order for the S-BOD value in the water quality measuring unit in the second step to be 45 mg/L, that is to say, in order for the ratio thereof to the BOD concentration of the raw water to be 15%, and then, the BOD concentration of the treated water after the sedimentation step was 9 mg/L, the removal ratio could be greatly increased to 97%, and the SS concentration was 10 mg/L. At this time, the raw water distribution amount was 11 m³/d. In addition, the S-BOD value in the second step was controlled so as to be 30 through 60 mg/L so that the ratio to the BOD concentration of the raw water became 10% to 20%, and then, the BOD concentration of the treated water after the sedimentation step was 9 mg/L, the removal ratio could be greatly increased to 97%, and the SS concentration was 10 mg/L to 14 mg/L, and thus, a state of "very satisfactory" could be maintained and the effects of the control could be verified.

As can be seen from the above results, the flow amount adjusting mechanism could be adjusted so that the ratio of the S-BOD value in the second step to the BOD concentration of the raw water was in a range from 6.7% to 30%, and then, a state with an evaluation of "satisfactory" or better could be achieved even in the case where the BOD concentration of the raw water and the BOD load of the entire system had increased.

Furthermore, the flow amount adjusting mechanism could be adjusted so that the ratio of the S-BOD value in the second step to the BOD concentration of the raw water was in a range from 10% to 20%, and then, a state with an evaluation of "very satisfactory" could be achieved.

It was clarified from the above that the control of the water quality in the present system was possible by setting the S-BOD value in the second step to a predetermined ratio relative to the BOD concentration of the raw water.

As can be seen from the above tests, the present system can be easily maintained in an optimal operation state by setting the ratio of the S-BOD value in the second step to the BOD concentration of the raw water to 6.7 to 30%, preferably 10% to 20%, and by operating the computing mechanism with this value so as to adjust the flow amount adjusting mechanism for the adjustment of the amount of raw water flowing into the second step even in the case where the BOD concentration of the raw water and the BOD load of the entire system fluctuate.

INDUSTRIAL APPLICABILITY

As described above, according to the present invention, it becomes possible to provide an apparatus and a method for biological treatment of organic wastewater where organic materials can be removed efficiently with high load while reducing the amount of air in the aerobic biological treatment and greatly reducing the amount of generated sludge, and at the same time, the water quality of the treated water can be maintained stably.

REFERENCE SIGNS LIST

1 Organic wastewater line
2 Flow amount adjusting mechanism (water amount distribution mechanism for organic wastewater)
3 First biological treatment tank
4 Second biological treatment tank
5 Sedimentation tank
6 Sludge returning line
7 Treated water flow-out line
8 Control unit
9 Water quality measuring unit
10 Flow-blocking wall
11 Inflow line of raw water into first biological treatment tank
12 Inflow line of raw water into second biological treatment tank
30 Fixed-type immobilized biocarrier
31, 41, 44 Air-diffusing means
42 Stirring means
43 Partition
S1, S2, S3 Sensor

What is claimed is:

1. An apparatus for biological treatment of organic wastewater, comprising:
    a first biological treatment tank having a fixed-type immobilized biocarrier and an air diffusing means that is arranged on a lower side of the fixed-type immobilized biocarrier;
    a second biological treatment tank having an air diffusing means into which treated liquid that has been treated in the first biological treatment tank can be introduced so as to be treated by suspended microorganisms without using a biocarrier;
    a sedimentation tank where solid-liquid separation can be carried out on a mixed liquid that has been treated in the second biological treatment tank so that the mixed liquid can be separated into sedimented sludge and treated water;
    an inflow line through which organic wastewater can be introduced so as to be distributed into the first biological treatment tank and the second biological treatment tank;
    a return sludge line for returning part of the sedimented sludge that has been discharged from the sedimentation tank to the second biological treatment tank;
    a flow amount adjustment mechanism for adjusting distribution amounts of the organic wastewater that is to be distributed to the first biological treatment tank and the second biological treatment tank;
    a first BOD sensor configured to measure a BOD value in the organic wastewater; and
    a second BOD sensor configured to measure a soluble BOD value of the treated liquid within the second biological treatment tank, wherein
    the flow amount adjusting mechanism is operatively connected to receive sensor data from the first and second BOD sensors,
    the flow amount adjustment mechanism is configured to adjust distribution amounts of the organic wastewater that is to be distributed to the first biological treatment tank and the second biological treatment tank in response to the sensor data from the first and second BOD sensors,
    the flow amount adjustment mechanism adjusting a supply amount of the organic wastewater to the second biological treatment tank to set a ratio Y (%) of a supply amount of the organic wastewater that can be supplied to the second biological treatment tank to a total supply amount of the organic wastewater to satisfy the following Formula 1 with a BOD volume load X (kg/m³/d) of an entirety of the first biological treatment tank and the second biological treatment tank being in a range of 0.5 or greater and less than 0.814, and to satisfy the following Formula 2 with X being in a range of 0.814 or greater and 1.5 or less, wherein $$5 \leq Y < -63X + 82.5 \quad \text{(Formula 1)}$$

$$5 \leq Y < -20X + 47.5 \quad \text{(Formula 2)}.$$

2. The apparatus for biological treatment of organic wastewater according to claim 1, further comprising:
a control device operatively connected to automatically control the flow adjustment mechanism, wherein
the flow adjustment mechanism is further configured to adjust distribution amounts of the organic wastewater that is to be distributed to the first biological treatment tank and the second biological treatment tank such that a ratio of a soluble BOD value in the second biological treatment tank to a BOD value of the organic wastewater is in a range from 6.7% to 30% based on the sensor data from the first and second BOD sensors.

3. The apparatus for biological treatment of organic wastewater according to claim 1, wherein a flow-blocking wall for preventing a flow of organic wastewater is arranged in the first biological treatment tank.

4. The apparatus for biological treatment of organic wastewater according to claim 1, wherein a stirring means for stirring the treated liquid is provided in the second biological treatment tank.

5. The apparatus for biological treatment of organic wastewater according to claim 2, wherein a flow-blocking wall for preventing a flow of organic wastewater is arranged in the first biological treatment tank.

6. The apparatus for biological treatment of organic wastewater according to claim 2, wherein a stirring means for stirring the treated liquid is provided in the second biological treatment tank.

7. The apparatus for biological treatment of organic wastewater according to claim 3, wherein a stirring means for stirring the treated liquid is provided in the second biological treatment tank.

8. The apparatus for biological treatment of organic wastewater according to claim 5, wherein a stirring means for stirring the treated liquid is provided in the second biological treatment tank.

* * * * *